US011234179B2

(12) United States Patent
Yang et al.

(10) Patent No.: US 11,234,179 B2

(45) Date of Patent: Jan. 25, 2022

(54) REDUCING A DATA TRANSMISSION DELAY OF A TERMINAL DEVICE IN A HANDOVER PROCESS

(71) Applicant: GUANGDONG OPPO MOBILE TELECOMMUNICATIONS CORP., LTD., Guangdong (CN)

(72) Inventors: Ning Yang, Dongguan (CN); Jianhua Liu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 31 days.

(21) Appl. No.: 16/623,853

(22) PCT Filed: Jul. 25, 2017

(86) PCT No.: PCT/CN2017/094335

§ 371 (c)(1),
(2) Date: Dec. 18, 2019

(87) PCT Pub. No.: WO2019/019023

PCT Pub. Date: Jan. 31, 2019

(65) Prior Publication Data

US 2020/0154331 A1 May 14, 2020

(51) Int. Cl.

*H04W 36/24* (2009.01)
*H04W 76/27* (2018.01)

(Continued)

(52) U.S. Cl.

CPC ......... *H04W 36/24* (2013.01); *H04W 12/033* (2021.01); *H04W 12/0471* (2021.01);

(Continued)

(58) Field of Classification Search

CPC . H04W 36/24; H04W 76/27; H04W 12/0471; H04W 12/033; H04W 36/0038;

(Continued)

(56) References Cited

U.S. PATENT DOCUMENTS 7,774,594 B2 8/2010 Lopez
8,032,746 B2 10/2011 Boppana (Continued)

FOREIGN PATENT DOCUMENTS

CN 101048001 A 10/2007
CN 101902834 A 12/2010

(Continued)

OTHER PUBLICATIONS

International Search Report in the international application No. PCT/CN2017/094335, dated Apr. 12, 2018.

(Continued)

*Primary Examiner* — Mewale A Ambaye

(57) ABSTRACT

Disclosed are a handover method and a terminal device. The method includes that a first access network device triggers at least one of a terminal device or a second access network device to configure a second protocol stack; and before the first access network device triggers the at least one of the terminal device or the second access network device to maintain the sequence of the data packets of the terminal device by use of the second protocol stack, the first access network device sequentially processes data packets to be processed of the terminal device by use of a first protocol stack.

20 Claims, 11 Drawing Sheets

(51) Int. Cl.

| | |
|---|---|
| ***H04W 36/00*** | (2009.01) |
| ***H04W 36/08*** | (2009.01) |
| ***H04W 72/04*** | (2009.01) |
| ***H04W 80/02*** | (2009.01) |
| ***H04W 12/033*** | (2021.01) |
| ***H04W 12/0471*** | (2021.01) |

(52) U.S. Cl.
CPC ....... *H04W 36/0038* (2013.01); *H04W 36/08* (2013.01); *H04W 72/042* (2013.01); *H04W 76/27* (2018.02); *H04W 80/02* (2013.01)

(58) Field of Classification Search
CPC ... H04W 36/08; H04W 72/042; H04W 80/02; H04W 36/14; H04W 76/00; H04W 76/10; H04W 12/0433; H04W 12/04; H04W 12/00; H04W 36/011; H04W 72/043; H04W 72/0433; H04W 72/0426; H04W 80/00; H04W 36/0027; H04W 36/0005; H04L 29/06551
See application file for complete search history.

(56) References Cited

U.S. PATENT DOCUMENTS

| | | | | |
|---|---|---|---|---|
| 8,274,938 | B2 | 9/2012 | Chang | |
| 9,380,642 | B2 | 6/2016 | Periyalwar | |
| 9,392,496 | B2 | 7/2016 | Low et al. | |
| 10,069,947 | B2 | 9/2018 | Yang et al. | |
| 10,986,549 | B2 * | 4/2021 | Wang | H04W 12/04 |
| 2007/0028090 | A1 | 2/2007 | Lopez | |
| 2008/0317002 | A1 | 12/2008 | Boppana | |
| 2010/0304782 | A1 | 12/2010 | Chang | |
| 2012/0177002 | A1 * | 7/2012 | Faucher | H04W 36/0069 370/331 |
| 2012/0218973 | A1 | 8/2012 | Du | |
| 2014/0248862 | A1 | 9/2014 | Periyalwar | |
| 2014/0269763 | A1 | 9/2014 | Gantman et al. | |
| 2014/0274065 | A1 | 9/2014 | Low et al. | |
| 2015/0312382 | A1 | 10/2015 | Gantman et al. | |
| 2015/0358813 | A1 | 12/2015 | Lee et al. | |
| 2016/0191471 | A1 | 6/2016 | Ryoo et al. | |
| 2016/0286472 | A1 | 9/2016 | Periyalwar et al. | |
| 2016/0337483 | A1 | 11/2016 | Yang et al. | |
| 2018/0020456 | A1 * | 1/2018 | Wan | H04W 76/20 |
| 2018/0098250 | A1 | 4/2018 | Vrzic | |
| 2018/0160303 | A1 | 6/2018 | Lee et al. | |
| 2018/0183767 | A1 | 6/2018 | Ryoo et al. | |
| 2018/0324651 | A1 | 11/2018 | Tenny et al. | |
| 2019/0069333 | A1 * | 2/2019 | Kim | H04W 36/0033 |
| 2019/0089682 | A1 | 3/2019 | Ryoo et al. | |
| 2019/0320476 | A1 * | 10/2019 | Wang | H04W 28/0268 |
| 2019/0342800 | A1 * | 11/2019 | Sirotkin | H04B 17/318 |
| 2019/0386965 | A1 | 12/2019 | Ryoo et al. | |
| 2020/0022032 | A1 | 1/2020 | Tenny et al. | |
| 2020/0076774 | A1 | 3/2020 | Ryoo et al. | |
| 2020/0195620 | A1 | 6/2020 | Ryoo et al. | |
| 2020/0404553 | A1 | 12/2020 | Lovlekar et al. | |
| 2021/0014764 | A1 * | 1/2021 | Zhang | H04W 12/041 |
| 2021/0014893 | A1 * | 1/2021 | Park | H04L 5/0092 |

FOREIGN PATENT DOCUMENTS

| | | | |
|---|---|---|---|
| CN | 102123457 | A | 7/2011 |
| CN | 103096303 | A | 5/2013 |
| CN | 104661270 | A | 5/2015 |
| CN | 105101164 | A | 11/2015 |
| CN | 105144784 | A | 12/2015 |
| CN | 105407461 | A | 3/2016 |
| CN | 104811431 | B | 1/2018 |
| EP | 1748615 | A1 | 1/2007 |
| KR | 20130118945 | A | 10/2013 |
| RU | 2568679 | C1 | 11/2015 |
| WO | 2013016797 | A1 | 2/2013 |
| WO | 2016140757 | A1 | 9/2016 |
| WO | 2018201985 | A1 | 11/2018 |

OTHER PUBLICATIONS

Written Opinion of the International Search Authority in the international application No. PCT/CN2017/094335, dated Apr. 12, 2018.
English translation of the Written Opinion of the International Search Authority in the international application No. PCT/CN2017/094335, dated Apr. 12, 2018.
3GPP TSG-RAN WG2#98 Tdoc, R2-1704434, Ericsson, "0 ms support during handover procedure in NR", mailed on May 9, 2017.
3GPP TSG-RAN WG2 Meeting #98, R2-1704529, MediaTek Inc, "Mobility Enhancement for '0ms Interruption' HO", mailed on May 9, 2017.
3GPP TSG-RAN WG2#98, R2-1704853, Huawei, HiSilicon, "SgNB to MgNB reconfiguration for 0ms interruption handover", mailed on May 9, 2017.
3GPP TSG-RAN2#98, R2-1704855, Huawei, HiSilicon, "DC operation for robust handover", mailed on May 9, 2017.
Notice of Allowance of the Russian application No. 2019144782, dated Nov. 17, 2020.
ZTE Corporation: "Discsssion on data forwarding in mobility enhancement solutions", 3GPP Draft R3-161144 Discussion on Data Forwarding in Mobility Enhancement Solutions V2, 3rd Generation Partnership Project (3GPP), vol. RAN WG3, No. Nanjing, China; May 23, 2016-May 27, 2016 May 22, 2016 (May 22, 2016), XP051105948, paragraph [002.]—paragraph [02.2].
Huawei et al: "Comparison of 0ms interruption solutions", 3GPP Draft; R2-1706707 Comparison of 0ms Interruption Solutions, 3rd Generation Partnership Project (3GPP), vol. RAN WG2, No. Qingdao, China; Jun. 27, 2017-Jun. 29, 2017 Jun. 26, 2017 (Jun. 26, 2017), XP051301207, paragraph [001.]—paragraph [02.3].
CAT: "Discussion on data forwarding for make before break solution", 3GPP Draft; R3-161152, 3rd Generation Partnership Project (3GPP), vol. RAN WG3, No. Nanjing, China; May 23, 2016-May 27, 2016 May 22, 2016 (May 22, 2016), XP051105956, paragraph [002.].
Supplementary European Search Report in the European application No. 17919528.4, dated May 12, 2020.
First Office Action of the Canadian application No. 3066655, dated Feb. 12, 2021.
Office Action of the Indian application No. 201917053985, dated Apr. 27, 2021.
Ericsson; "0 ms interruption support during handover procedure in NR", 3GPP TSG-RAN WG2 NR AH#2 Tdoc R2-1706625, Qingdao, China, Jun. 27-29, 2017.
First Office Action of the Korean application No. 10-2019-7035311, dated May 4, 2021.
International Search Report in the international application No. PCT/CN2018/110289, dated Jun. 24, 2019.
Written Opinion of the International Search Authority in the international application No. PCT/CN2018/110289, dated Jun. 24, 2019.
First Office Action of the U.S. Appl. No. 17/220,800, dated Jun. 18, 2021.
First Office Action of the European application No. 17919528.4, dated May 28, 2021.
Written Opinion of the Singaporean application No. 11201912337T, dated Jun. 22, 2021.
First Office Action of the Japanese application No. 2019-567262, dated Jul. 16, 2021.
OPPO: "Discussion on mobility enhancement in LTE", 3GPP Draft; R2-1813794-Discussion on Mobility Enhancement in LTE, 3rd Generation Partnership Project (3GPP), vol. RAN WG2, No. Chengdu, China; 201181008-2018101228 Sep. 2018 (Sep. 28, 2018), XP051523284, 3 Pages.
Apple Inc: "Key Change in DC based HO", 3GPP Draft: R2-1814584 DC Based HO in LTE 3rd Generation Partnership Project (3GPP), vol. RAN WG2, No. Chengdu, China; 20181008-2018101228 Sep. 2018 (Sep. 28, 2018), XP051524009, 3 Pages.

(56) References Cited

OTHER PUBLICATIONS

Supplementary European Search Report Appln. No. 18937333.5, dated Aug. 12, 2021.
First Office Action of the Taiwanese application No. 107125711, dated Sep. 24, 2021.
Second Office Action of the Canadian application No. 3066655, dated Nov. 17, 2021.

* cited by examiner

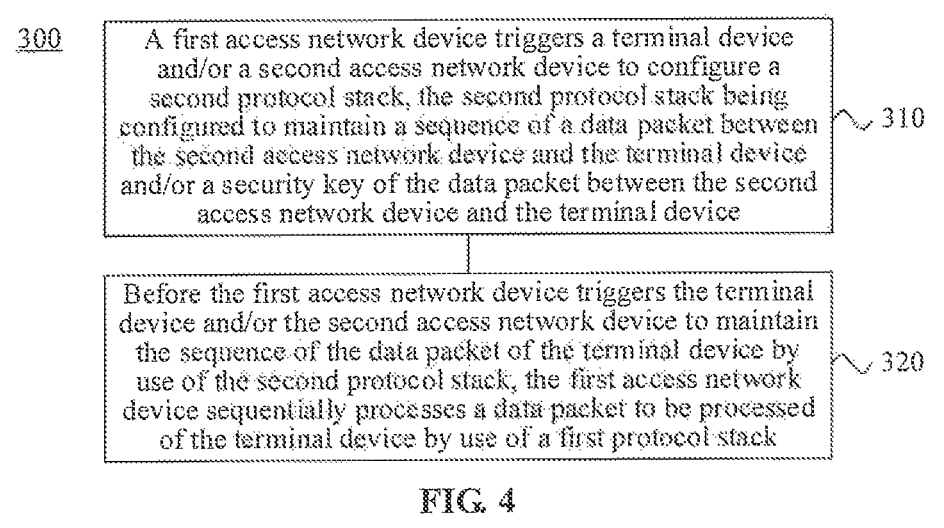

300

A first access network device triggers a terminal device and/or a second access network device to configure a second protocol stack, the second protocol stack being configured to maintain a sequence of a data packet between the second access network device and the terminal device and/or a security key of the data packet between the second access network device and the terminal device — 310

Before the first access network device triggers the terminal device and/or the second access network device to maintain the sequence of the data packet of the terminal device by use of the second protocol stack, the first access network device sequentially processes a data packet to be processed of the terminal device by use of a first protocol stack — 320

FIG. 4

REDUCING A DATA TRANSMISSION DELAY OF A TERMINAL DEVICE IN A HANDOVER PROCESS

TECHNICAL FIELD

Embodiments of the disclosure relate to the field of communication, and more particularly to a handover method, an access network device and a terminal device.

BACKGROUND

A handover flow in an existing Long Term Evolution (LTE) system is as follows. A source access network device sends a handover request to a target access network device according to a measurement report reported by a terminal device and, after receiving a response to the handover request from the target access network device, sends a handover command to the terminal device. The terminal device performs reconfiguration according to the handover command, leaves a source cell and performs synchronization with a target cell. For data between the terminal device and the source access network device, the source access network device is required to transmit cached data to the target access network device, and the data may be processed only when synchronization between the target access network device and the terminal device is completed. For these data, a relatively long waiting delay is required in a handover process of the terminal device.

SUMMARY

In view of this, the embodiments of the disclosure provide a handover method, an access network device and a terminal device, which are favorable for reducing a data transmission delay of a terminal device in a handover process.

In a first aspect, a handover method is provided, which includes that: a first access network device triggers at least one of a terminal device or a second access network device to configure a second protocol stack, the second protocol stack being configured to maintain at least one of a sequence of data packets between the second access network device and the terminal device or a security key of the data packets between the second access network device and the terminal device; and before the first access network device triggers at least one of the terminal device or the second access network device to maintain the sequence of the data packets of the terminal device by use of the second protocol stack, the first access network device sequentially processes data packets to be processed between the first access network device and the terminal device by use of a first protocol stack.

A data packet usually consists of a header and a data part, the header is a tag for a receiver to recognize, and the data part is raw data. In the embodiments of the disclosure, the data packet may include, but not limited to, a Packet Data Convergence Protocol (PDCP) Protocol Data Unit (PDU), and the data part may include, but not limited to, a PDCP Service Data Unit (SDU).

Optionally, the first access network device may trigger a first terminal device only. For example, when the first terminal device moves to coverage of the second access network device connected with a second terminal device and the first terminal device may form a Device-to-Device (D2D) connection with the second terminal device, the first network device may trigger the first terminal device, and the first terminal device may trigger the second network device through the second terminal device to set up a new protocol stack.

Optionally, the first access network device may also trigger the second access network device only. For example, when the first terminal device moves to the coverage of the second access network device connected with the second terminal device and the first terminal device may form the D2D connection with the second terminal device, the first network device may trigger the second network device, and the second network device may trigger the first terminal device through the second terminal device to set up a new protocol stack.

Optionally, the operation that the first access network device triggers the terminal device and the second access network device to configure the second protocol stack includes that: the first access network device sends first triggering information to the second access network device, the first triggering information being configured to request the second access network device to configure the second protocol stack; the first access network device receives response information to the first triggering information from the second access network device; and the first access network device sends second triggering information to the terminal device according to the response information, the second triggering information being configured to instruct the terminal device to configure the second protocol stack.

The sequence of the data packets is continued to be maintained by the old protocol stack before the first access network device triggers at least one of the terminal device or the second access network device to completely use the new protocol stack, so that data of the terminal device may be timely processed, and a data transmission delay of the terminal device in a handover process is reduced.

In a possible implementation, the data packets to be processed may include first data packets, and the operation that the first access network device sequentially processes the data packets to be processed between the first access network device and the terminal device by use of the first protocol stack before the first access network device triggers at least one of the terminal device or the second access network device to maintain the sequence of the data packets of the terminal device by use of the second protocol stack may include that: before the first access network device triggers at least one of the terminal device or the second access network device to maintain the sequence of the data packets of the terminal device by use of the second protocol stack, the first access network device receives the first data packets sent by the terminal device; the first access network device decrypts the first data packets or a data part in each of the first data packets by use of the first protocol stack; and the first access network device sequentially processes the decrypted first data packets by use of the first protocol stack.

In a possible implementation, the data packets to be processed may include second data packets, and the operation that the first access network device sequentially processes the data packets to be processed between the first access network device and the terminal device by use of the first protocol stack before the first access network device triggers at least one of the terminal device or the second access network device to maintain the sequence of the data packets of the terminal device by use of the second protocol stack may include that: before the first access network device triggers at least one of the terminal device or the second access network device to maintain the sequence of the data packets of the terminal device by use of the second protocol stack, the first access network device receives a data part in each of the second data packets sent by a core network device, and the first access network device sequentially processes the second data packets by use of the first protocol stack. The method may further include that: the first access network device encrypts the sequentially processed second data packets or the data part in each of the second data packets by use of the first protocol stack.

In a possible implementation, the data packets to be processed may include third data packets, and the operation that the first access network device sequentially processes the data packets to be processed between the first access network device and the terminal device by use of the first protocol stack before the first access network device triggers at least one of the terminal device or the second access network device to maintain the sequence of the data packets of the terminal device by use of the second protocol stack may include that: before the first access network device triggers at least one of the terminal device or the second access network device to maintain the sequence of the data packets of the terminal device by use of the second protocol stack, the first access network device receives the third data packets sent by the second access network device, the third data packets or a data part in each of the third data packets having being decrypted by the second access network device by use of the second protocol stack; and the first access network device sequentially processes the decrypted third data packets.

In a possible implementation, the data packets to be processed may include fourth data packets, and the operation that the first access network device sequentially processes the data packets to be processed between the first access network device and the terminal device by use of the first protocol stack before the first access network device triggers at least one of the terminal device or the second access network device to maintain the sequence of the data packets of the terminal device by use of the second protocol stack may include that: before the first access network device triggers at least one of the terminal device or the second access network device to maintain the sequence of the data packets of the terminal device by use of the second protocol stack, the first access network device receives a data part in each of the fourth data packets sent by a core network device, and the first access network device sequentially processes the fourth data packets by use of the first protocol stack. The method may further include that: the first access network device sends the sequentially processed fourth data packets to the second access network device, such that the second access network device encrypts the sequentially processed fourth data packets or the data part in each of the fourth data packets by use of the second protocol stack.

In a possible implementation, the method may further include that: under the condition that the first access network device determines that no data packet or data of the terminal device is required to be processed by the first access network device, the first access network device triggers at least one of the terminal device or the second access network device to maintain the sequence of the data packets of the terminal device by use of the second protocol stack.

In a possible implementation, the operation that the first access network device triggers the terminal device to maintain the sequence of the data packets of the terminal device by use of the second protocol stack under the condition that the first access network device determines that no data packet or data of the terminal device is required to be processed by the first access network device may include that: under the condition that the first access network device determines that no data packet or data of the terminal device is required to be processed by the first access network device, the first access network device sends first indication information to the terminal device, the first indication information being configured to instruct the terminal device to maintain the sequence of the data packets of the terminal device by use of the second protocol stack.

In a possible implementation, the first indication information may further be configured to instruct the terminal device to release the first protocol stack.

In a possible implementation, the first indication information may be any one of Radio Resource Control (RRC) signaling, Medium Access Control (MAC) signaling, Downlink Control Information (DCI) or a bit in a data packet.

In a possible implementation, the operation that the first access network device triggers the second access network device to maintain the sequence of the data packets of the terminal device by use of the second protocol stack under the condition that the first access network device determines that no data packet or data of the terminal device is required to be processed by the first access network device may include that: under the condition that the first access network device determines that no data packet of the terminal device is required to be processed by the first access network device, the first access network device sends second indication information to the second access network device, the second indication information being configured to instruct the second access network device to maintain the sequence of the data packets of the terminal device by use of the second protocol stack.

In a possible implementation, the method may further include that: the first access network device determines that no data packet of the terminal device is required to be processed by the first access network device.

In a possible implementation, the operation that the first access network device determines that no data packet or data of the terminal device is required to be processed by the first access network device may include that: the first access network device receives third indication information sent by the core network device, the third indication information being to indicate that no data packet of the terminal device is required to be processed by the first access network device; and the first access network device determines according to the third indication information that no data packet or data of the terminal device is required to be processed by the first access network device.

The third indication information may be an end marker.

In a possible implementation, the method may further include that: the first access network device receives fourth indication information sent by the second access network device, the fourth indication information being to indicate that the terminal device has completed configuration of the second protocol stack; and the first access network device sends path switch information to the core network device according to the fourth indication information, the path switch information being configured to instruct the core network device to switch an access network device, which is responsible for maintaining the sequence of the data packets of the terminal device, from the first access network device to the second access network device.

Optionally, in a possible implementation, the operation that the first access network device receives the third indication information sent by the core network device may include that: after the first access network device sends the path switch information to the core network device, the first access network device receives the third indication information sent by the core network device.

In a possible implementation, the first access network device may be a source access network device, and the second access network device may be a target access network device; or the first access network device may be a primary access network device in a multi-connection scenario, and the second access network device may be a secondary access network device in the multi-connection scenario.

In a second aspect, a handover method is provided, which includes that: a second access network device receives first triggering information sent by a first access network device, the first triggering information being configured to trigger the second access network device to configure a second protocol stack, and the second protocol stack being configured to maintain at least one of a sequence of data packets between the second access network device and a terminal device or a security key of the data packets between the second access network device and the terminal device; and the second access network device receives second triggering information sent by the first access network device, the second triggering information being configured to trigger the second access network device to maintain the sequence of the data packets of the terminal device by use of the second protocol stack.

In a possible implementation, the method may further include that: before the second access network device receives the second triggering information sent by the first access network device, the second access network device receives a sequentially processed and encrypted first data packets sent by the first access network device; and the second access network device forwards the sequentially processed and encrypted first data packets to the terminal device.

In a possible implementation, the method may further include that: before the second access network device receives the second triggering information sent by the first access network device, the second access network device receives a sequentially processed second data packets sent by the first access network device; the second access network device encrypts the second data packets or a data part in each of the second data packets by use of the second protocol stack; and the second access network device sends the encrypted second data packets to the terminal device.

In a possible implementation, the method may further include that: before the second access network device receives the second triggering information sent by the first access network device, the second access network device receives third data packets sent by the terminal device; and the second access network device forwards the third data packets to the first access network device, such that the first access network device decrypts and sequentially processes the third data packets or a data part in each of the third data packets.

In a possible implementation, the method may further include that: before the second access network device receives the second triggering information sent by the first access network device, the second access network device receives fourth data packets sent by the terminal device; the second access network device decrypts the fourth data packets or a data part in each of the fourth data packets by use of the second protocol stack; and the second access network device sends the decrypted fourth data packets to the first access network device, such that the first access network device sequentially processes the decrypted fourth data packets.

In a possible implementation, the method may further include that: the second access network device receives first indication information sent by the terminal device, the first indication information being to indicate that the terminal device has completed configuration of the second protocol stack; and the second access network device sends path switch information to a core network device according to the first indication information, or the second access network device triggers the first access network device to send the path switch information to the core network device according to the first indication information, the path switch information being configured to instruct the core network device to switch an access network device maintaining the sequence of the data packets of the terminal device from the first access network device to the second access network device.

In a possible implementation, the second triggering information may be any one of RRC signaling, MAC signaling, DCI or a bit in a data packet.

In a possible implementation, the first access network device may be a source access network device, and the second access network device may be a target access network device; or the first access network device may be a primary access network device in a multi-connection scenario, and the second access network device may be a secondary access network device in the multi-connection scenario.

In a third aspect, a handover method is provided, which includes that: a terminal device configures a second protocol stack according to first triggering information sent by a first access network device, the second protocol stack being configured to maintain at least one of a sequence of data packets between a second access network device and the terminal device or a security key of the data packets between the second access network device and the terminal device; and before the terminal device receives second triggering information sent by at least one of the first access network device or the second access network device, the terminal device sequentially processes data packets to be processed of the terminal device by use of a first protocol stack, the second triggering information being configured to trigger the terminal device to maintain the sequence of the data packets of the terminal device by use of the second protocol stack.

In a possible implementation, data to be processed may include first data, and the operation that the terminal device sequentially processes the data packets or data to be processed of the terminal device by use of time first protocol stank before the terminal device receives the second triggering information sent by at least one of the first access network device or the second access network device may include that the terminal device sequentially processes the first data by use of the first protocol stack. The method may further include that: the terminal device encrypts the sequentially processed first data or data packets including the first data by use of the first protocol stack, and the terminal device sends the encrypted data packets including the first data to at least one of the first access network device or the second access network device.

In a possible implementation, the data packets to be processed may include first data packets, and the operation that the terminal device sequentially processes the data packets or data to be processed of the terminal device by use of the first protocol stack before the terminal device receives the second triggering information sent by at least one of the first access network device or the second access network device may include that: before the terminal device receives the second triggering information sent by at least one of the first access network device or the second access network device, the terminal device receives the first data packets sent by at least one of the first access network device or the second access network device; the terminal device decrypts the first data packets or a data part in each of the first data packets by use of the first protocol stack; and the terminal device sequentially processes the decrypted first data packets by use of the first protocol stack.

In a possible implementation, the data to be processed may include second data, and the operation that the terminal device sequentially processes the data packets or data to be processed of the terminal device by use of the first protocol stack before the terminal device receives the second triggering information sent by at least one of the first access network device or the second access network device may include that the terminal device sequentially processes the second data by use of the first protocol stack. The method may further include that: the terminal device encrypts the sequentially processed second data or data packets including the second data by use of the second protocol stack, and the terminal device sends the encrypted data packets including the second data to the second access network device.

In a possible implementation, the data packets to be processed may include second data packets, and the operation that the terminal device sequentially processes the data packets or data to be processed of the terminal device by use of the first protocol stack before the terminal device receives the second triggering information sent by at least one of the first access network device or the second access network device may include that: the terminal device receives the second data packets sent by the second network device; the terminal device decrypts the second data packets or a data part in each of the second data packets by use of the second protocol stack; and the terminal device sequentially processes the decrypted second data packets by use of the first protocol stack.

In a possible implementation, the method may further include that: the terminal device receives the second triggering information sent by at least one of the first access network device or the second access network device; and the terminal device maintains the sequence of the data packets of the terminal device by use of the second protocol stack according to the second triggering information.

In a possible implementation, the second triggering information may further be configured to instruct the terminal device to release the first protocol stack, and the method may further include that: the terminal device releases the first protocol stack according to the second triggering information.

In a possible implementation, the second triggering information may be any one of RRC signaling, MAC signaling, DCI or a bit in a data packet.

In a possible implementation, the first access network device may be a source access network device, and the second access network device may be a target access network device; or the first access network device may be a primary access network device in a multi-connection scenario, and the second access network device may be a secondary access network device in the multi-connection scenario.

In a fourth aspect, an access network device is provided, which is configured to execute the method in the first aspect or any possible implementation of the first aspect. Specifically, the access network device includes units configured to execute the method in the first aspect or any possible implementation of the first aspect.

In a fifth aspect, an access network device is provided, which is configured to execute the method in the second aspect or any possible implementation of the second aspect. Specifically, the access network device includes units configured to execute the method in the second aspect or any possible implementation of the second aspect.

In a sixth aspect, a terminal device is provided, which is configured to execute the method in the third aspect or any possible implementation of the third aspect. Specifically, the terminal device includes units configured to execute the method in the third aspect or any possible implementation of the third aspect.

In a seventh aspect, an access network device is provided, which includes a memory, a processor, an input interface and an output interface. The memory, the processor, the input interface and the output interface are connected through a bus system. The memory is configured to store an instruction. The processor is configured to execute the instruction stored in the memory to execute the method in the first aspect or any possible implementation of the first aspect.

In an eighth aspect, an access network device is provided, which includes a memory, a processor, an input interface and an output interface. The memory, the processor, the input interface and the output interface are connected through a bus system. The memory is configured to store an instruction. The processor is configured to execute the instruction stored in the memory to execute the method in the second aspect or any possible implementation of the second aspect.

In a ninth aspect, a terminal device is provided, which includes a memory, a processor, an input interface and an output interface. The memory, the processor, the input interface and the output interface are connected through a bus system. The memory is configured to store an instruction. The processor is configured to execute the instruction stored in the memory to execute the method in the third aspect or any possible implementation of the third aspect.

In a tenth aspect, a computer storage medium is provided, which is configured to store a computer software instruction for executing the method in the first aspect or any possible implementation of the first aspect, or the method in the second aspect or any possible implementation of the second aspect, or the method in the third aspect or any possible implementation of the third aspect, the instruction including a program designed to execute the above aspects.

In an eleventh aspect, a computer program product including an instruction is provided, when being run in a computer, the computer program product causes the computer to execute the method in the first aspect or any optional implementation of the first aspect, or the method in the second aspect or any optional implementation of the second aspect, or the method in the third aspect or any optional implementation of the third aspect.

These or other aspects of the disclosure will become clearer and easier to understand through the following descriptions about the embodiments.

BRIEF DESCRIPTION OF DRAWINGS

FIG. 4 is a schematic block diagram showing a handover method according to an embodiment of the disclosure.

DETAILED DESCRIPTION

Figure 1:
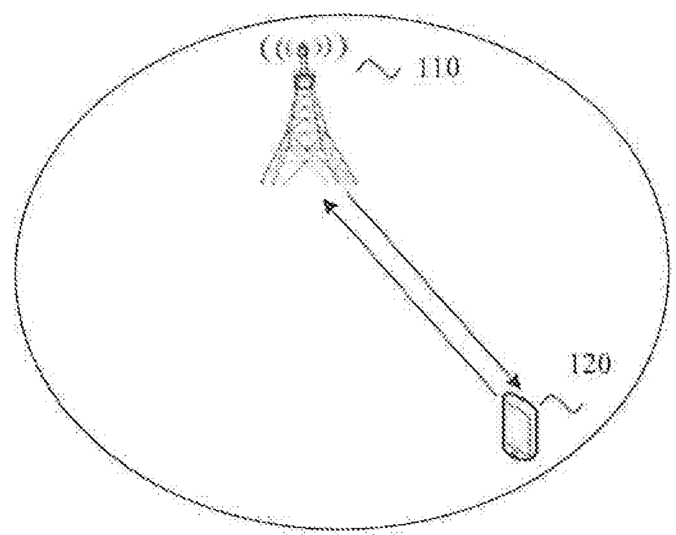
FIG. 1 is a schematic diagram showing an application scenario of an embodiment of the disclosure.

The technical solutions in the embodiments of the disclosure will be clearly and completely described below in combination with the drawings in the embodiments of the disclosure.

It is to be understood that the technical solutions in the embodiments of the disclosure may be applied to various communication systems, for example, a Global System of Mobile Communication (GSM) system, a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system, a New Radio (NR) system or a future 5th-Generation (5G) system.

Particularly, the technical solutions in the embodiments of the disclosure may be applied to various non-orthogonal multiple access technology-based communication systems, for example, a Sparse Code Multiple Access (SCMA) system or a Low Density Signature (LDS) system, and of course, the SCMA system and the LDS system may also have other names in the field of communication. Furthermore, the technical solutions in the embodiments of the disclosure may be applied to a multi-carrier transmission system adopting non-orthogonal multiple access technology, for example, Orthogonal Frequency Division Multiplexing (OFDM), Filter Bank Multi-Carrier (FBMC), Generalized Frequency Division Multiplexing (GFDM) and Filtered-OFDM (F-OFDM) systems adopting the non-orthogonal multiple access technologies.

In the embodiments of the disclosure, a terminal device may refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or other processing device connected to a wireless modem, a vehicle-mounted device, a wearable device, a terminal device in a future 5G network, a terminal device in a future evolved Public Land Mobile Network (PLMN) or the like, which is not limited in the embodiments of the disclosure.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. The network device may be a relay station, an access point, a vehicle-mounted device, a wearable device, a network device in the future 5G network, a network device in the future evolved PLMN or the like, which is not limited in the embodiments of the disclosure.

FIG. 1 is a schematic diagram showing an application scenario of an embodiment of the disclosure. A communication system in FIG. 1 may include a terminal device 120 and a network device 110. The network device 110 is configured to provide a communication service for the terminal device 120 for access a core network. The terminal device 120 searches for a synchronization signal, a broadcast signal and the like sent by the network device 110 to access the network, thereby communicating with the network. Arrows shown in FIG. 1 may represent uplink/downlink transmission implemented through a cellular link between the terminal device 120 and the network device 110.

Figure 2:
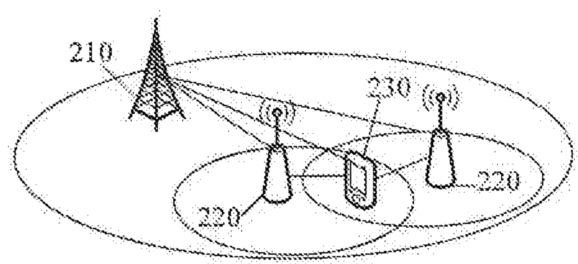
FIG. 2 is a schematic diagram showing another application scenario of an embodiment of the disclosure.

FIG. 2 is a schematic diagram showing another application scenario of an embodiment of the disclosure. Access network devices around a terminal device 230 in FIG. 2 include a primary access network device 210 and at least one secondary access network device 220. The at least one secondary access network device 220 is connected with the primary access network device 210 respectively to form multiple connections, and is connected with the terminal device 230 to provide service for it respectively. The primary access network device 210 may be an LTE network, and the secondary access network device 220 may be an NR network. Alternately, the primary access network device 210 may be an NR network, and the secondary access network device 220 may be an LTE network. Alternately, both the primary access network device 210 and the secondary access network device 220 are NR networks. The application scenarios of the technical solutions are not limited in the disclosure. The terminal device 230 may simultaneously establish connections with the primary access network device 210 and the secondary access network device 220. The connection established between the terminal device 230 and the primary access network device 210 is a primary connection, and the connection established between the terminal device 230 and the secondary access network device 220 is a secondary connection. Control signaling for the terminal device 230 may be transmitted through the primary connection, and data for the terminal device may be simultaneously transmitted through the primary connection and the secondary connection and may also be transmitted through the secondary connection only.

In the embodiments of the disclosure, the primary access network device may be, for example, a Macrocell, and the secondary access network device may be, for example, a Microcell, a Picocell or a Femtocell. However, the embodiments of the disclosure are not limited thereto.

More specifically, the primary access network device may be an LTE network device and the secondary access network device is an NR network device. It is to be understood that the embodiments of the disclosure are not limited thereto. The primary access network device may also be a GSM network device, a CDMA network device and the like. The secondary access network device may also be a GSM network device, a CDMA network device and the like, which is not limited in the embodiments of the disclosure.

In the embodiments of the disclosure, a core network device may be a Mobility Management Entity (MME) and may also be a Serving Gateway (S-GW) or a Packet Data Network Gateway (P-GW), which is not limited in the disclosure.

Figure 3:
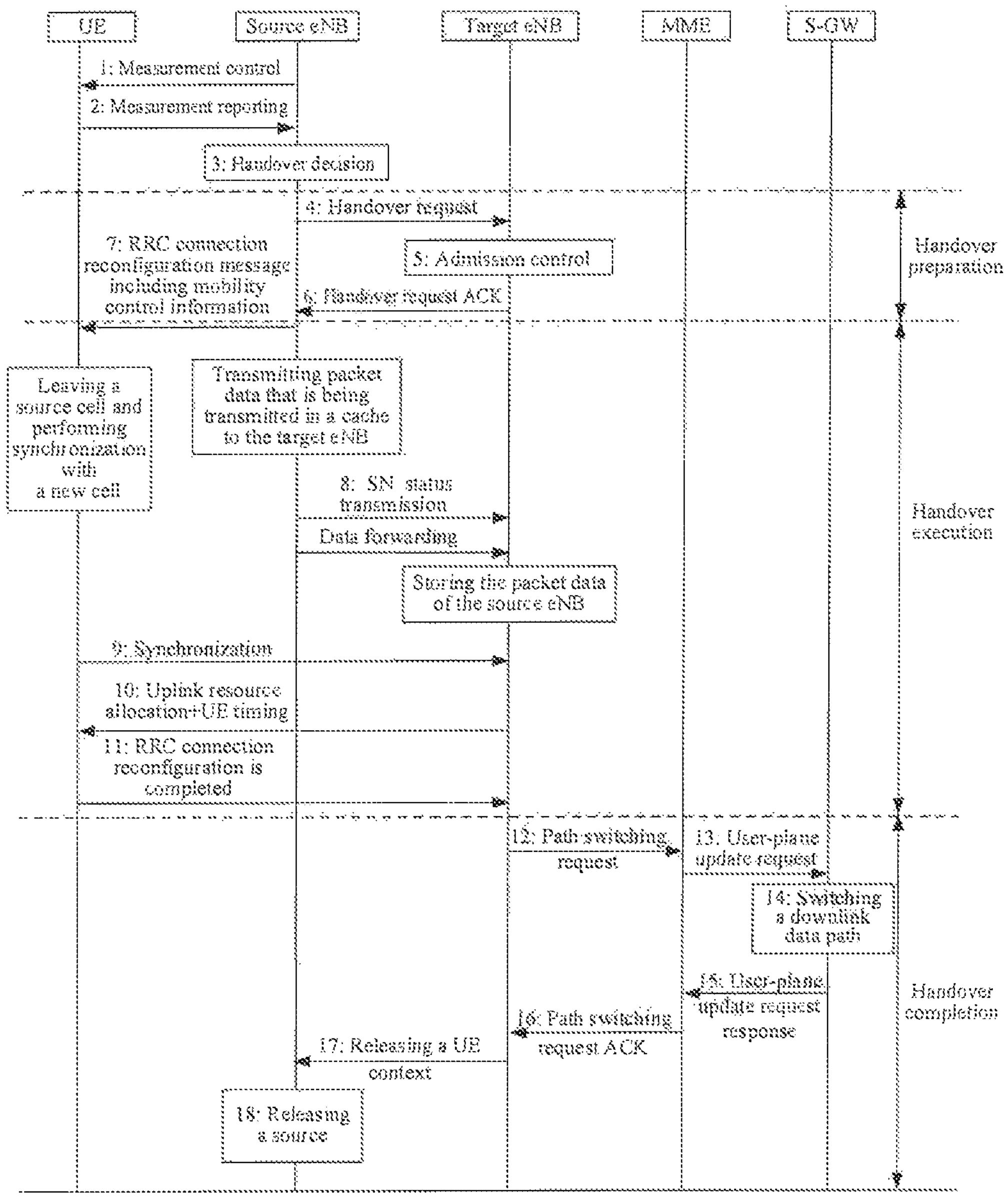
FIG. 3 is a schematic flowchart showing a LTE handover.

For ease of understanding, a handover flow in an LTE system will be described below in combination with FIG. 3 in detail. As shown in FIG. 3, the handover flow includes part or all of the following steps.

In 1, a source eNB transmits a measurement configuration to UE, a measurement result of the LTE being used to assist the source eNB in performing handover decision.

In 2, the UE reports a measurement report according to the measurement configuration.

In 3, the source eNB performs handover decision according to its own handover algorithm with reference to a measurement result reported by the UE.

In 4, the source eNB sends a handover request message to a target eNB, the message including information about a preparation for handover, mainly including a UE X2/S1 signaling context reference, an identifier of a target cell, a security key, an RRC context, an Access Stratum (AS) configuration, an Evolved-Universal Terrestrial Radio Access (E-UTRAN) Radio Access Bearer (E-RAB) context and the like. The message also includes a Physical (PRY) identifier of a source cell and a message authentication and verification code for a possible recovery process after a handover failure. The UE X2/S1 signaling context reference may help the target eNB find a position of the source eNB. The E-RAB context includes required Radio Network Layer (RLN) and Transport Network Layer (TNL) addressing information, E-RAB Quality of Service (QoS) information and the like.

In 5, the target eNB performs admission control according to the received E-RAB QoS information to increase a success rate of handover. For admission control, reservation of a corresponding resource, a Cell Radio Network Temporary Identifier (C-RNTI), allocation of a dedicated random access preamble and the like are required to be considered. The AS configuration for a target cell may be a complete configuration completely independent of a source cell and may also be an incremental configuration based on the source cell (the incremental configuration refers to that the same part is not configured, only a different part is reconfigured through signaling, and the UE will continue to use the original configuration for the configuration that has not been received).

In 6, the target eNB makes Layer 1 (L1)/Layer 2 (L2) handover preparations and simultaneously sends a handover request Acknowledgement (ACK) message to the source eNB. The message includes an RRC container, and a specific content is a handover command that triggers the UE to perform handover. The source eNB sends the handover command to the UE in a transparent transmission manner (without any modification). The handover command includes a new C-RNTI and a case algorithm identifier of the target eNB, and may also contain the dedicated random access preamble, an access parameter, system information and the like. If necessary, the handover request ACK message may further contain the RNL/TNL information for data forwarding. After the source eNB receives the handover request ACK message or forwards the handover command to the UE, the data forwarding may be started.

In 7, the handover command (an RRC connection reconfiguration message containing mobility control information) is generated by the target eNB and transparently transmitted to the UE through the source eNB. The source eNB performs required encryption and integrity protection on the message. The UE, after receiving the message, may initiate a handover process by use of a related parameter in the message. The UE may initiate the handover process without waiting for a Hybrid Automatic Repeat reQuest (HARQ)/Automatic Repeat reQuest (ARQ) response sent to the source eNB by a lower layer.

In 8, the source eNB sends a Sequence Number (SN) status transmission message to the target eNB to transmit an uplink PDCP SN receiving status and a downlink PDCP SN sending status of an E-RAB. The uplink PDCP SN receiving status at least includes a PDCP SN of a last uplink SDU received in sequence and may also include SNs of lost uplink SDUs that cause out-of-order reception and are represented in a bit mapping form (if such SDUs exist, these SDUs may be required to be retransmitted by the UE in the target cell). The downlink PDCP SN sending status indicates a serial number of a next SDU that should be allocated by the target eNB. If there is no E-RAE that needs to send a PDCP status report, the source eNB may omit the message.

In 9, the UE, after receiving the handover command, executes synchronization with the target cell. If the dedicated random access preamble is configured in the handover command, a non-contention random access procedure is used to access the target cell. If no dedicated preamble is configured, a contention-based random access procedure is used to access the target cell. The UE calculates a key required to be used by the target eNB and configures a security algorithm selected by a network to be used by the target eNB to communicate with the target eNB after successful handover.

In 10, the network returns an uplink resource allocation indication and a timing advance.

In 11, after the UE successfully accesses the target cell, the UE sends an RRC connection reconfiguration complete message to the target eNB to confirm that the handover process has been completed. If there are enough resources, the message may also be accompanied with an improvement of an uplink Buffer Status Report (BSR). The target eNB receives the RRC connection reconfiguration complete message to confirm successful handover. The target eNB may then start sending data to the UE.

In 12, the target eNB sends a path switching request message to an MME to notify that the UE has been handed over to another cell. In such case, radio handover has been successfully completed.

In 13, the MME sends a user-plane update request message to an S-GW.

In 14, the S-GW switches a downlink data path to a target eNB side. The S-GW sends one or more "end marker packets" to the source eNB through an old path, and then a user-plane resource of the source eNB may be released.

In 15, the S-GW sends a user-plane update response message to the MME.

In 16, the MME sends a path switching request ACK message to the target eNB. A path switching process is completed by 12~16, and this process is executed to switch a user-plane data path from the source eNB to the target eNB. After the S-GW switches the downlink path, data packets of a forwarding path and a new path may alternately arrive at the target eNB. The target eNB should transmit all forward data packets to the UE at first and then transmit the packets received from the new path. Adopting this method for the target eNB may forcibly ensure a correct transmission sequence. For assisting a resequencing function at the target eNB, after path switching of the E-RAB, the S-GW immediately sends one or more "end marker packets" on the old path. The "end marker packet" includes no user data and is indicated by a General Data Transfer Platform (GTP) header. After completing sending the packet with a marker, the S-GW should not send any data packet on the old path. After receiving the "end marker packet", if forwarding is active for this hearer, the source eNB should send the packet to the target eNB. After detecting the "end marker packet", the target eNB should discard the "end marker packet" and initiate any required flow to maintain sequential submission of a user, and the data is forwarded through an X2 interface or received from the S-GW through an S1 interface after path switching.

In 17, the target eNB sends a UE context release message to the source eNB to notify the source eNB of successful handover and trigger resource release of the source eNB. The target eNB, after receiving the path switching ACK message returned by the MME, sends the message.

In 18, the source eNB, after receiving the UE context release message, may release a radio bearer and a control-plane resource related to a UE context. Any ongoing data forwarding is continued.

As shown in FIG. 3, after the source eNB sends the RRC connection reconfiguration message to the UE, the UE may leave a source cell and perform synchronization with the target cell, that is, the UE may disconnect a network connection from the source eNB. For data between the UE and the source eNB, the source eNB is required to transmit cached data to the target eNB, and the data may be processed until a bearer between the target eNB and the UE is established. For these data, a relatively long waiting delay is required in the handover process of the UE. For the UE, the time for the UE to disconnect from the network is also relatively long and a service of the UE may not be timely processed, so that performance of the network transmission is relatively poor.

FIG. 4 is a schematic block diagram showing a handover method 300 according to an embodiment of the disclosure. As shown in FIG. 4, the method 300 includes part or all of contents in the following operations.

At S310, a first access network device triggers a terminal device and/or a second access network device to configure a second protocol stack, the second protocol stack being configured to maintain a sequence of data packets between the second access network device and the terminal device and/or a security key of the data packets between the second access network device and the terminal device.

In S320, before the first access network device triggers the terminal device and/or the second access network device to maintain the sequence of the data packets of the terminal device by use of the second protocol stack, the first access network device sequentially processes data packets to be processed between the first access network device and the terminal device by use of a first protocol stack.

Those skilled in the art understand that a data packet usually consists of a header and a data part, the header is a tag for a receiver to recognize, and the data part is raw data. In the embodiment of the disclosure, the data packet may include, but not limited to a PDCP PDU. Hereinafter, the data packet in the embodiment of the disclosure is, for example, a PDCP PDU and the data part in the data packet in the embodiment of the disclosure is an SDU. The embodiment of the disclosure is not limited thereto.

Optionally, the technical solution of the embodiment of the disclosure may not only be applied to a single-connection handover scenario in FIG. 1 but also be applied to a multi-connection role switching scenario in FIG. 2. For the sake of description, the technical solution of the method 100 will be briefly introduced below with the single-connection handover scenario as an example at first.

Specifically, the first access network device, i.e., a source access network device, may trigger the terminal device and/or the second access network device, i.e., a target access network device, to configure the second protocol stack (called a new protocol stack hereinafter) according to part or all of the steps in 1~7 in the handover flow shown in FIG. 3. The new protocol stack includes a PDCP layer/Radio Link Control (RCL) layer/MAC layer/PHY layer. The PDCP layer of the new protocol stack may maintain a sending or receiving sequence of PDCP PDUs and a security key of the PDCP PDUs. That is, after the terminal device is handed over to the second access network device, a data packet may be transmitted between the terminal device and the second access network device by use of the new protocol stack. In the embodiment of the disclosure, when triggering the terminal device and/or the second access network device to configure the second protocol stack, the first access network device may notify the terminal device and/or the second access network device not to release the first protocol stack (called an old protocol stack hereinafter). That is, when the terminal device and/or the second access network device are/is triggered by the first access network device to set up the new protocol stack, the terminal device is kept connected with the first access network device. In the embodiment of the disclosure, the first access network device may further trigger the terminal device and/or the second access network device to maintain the sequence of the PDCP PDUs by use of the new protocol stack later, that is, the first access network device triggers the terminal device to be completely handed over to the second access network device, or the first access network device triggers the second access network device to notify a core network device to completely switch a downlink path. Before the first access network device triggers the terminal device and/or the second access network device to maintain the sequence of the PDCP PDUs by use of the new protocol stack, the first access network device may continue to maintain the sequence of the PDCP PDUs by use of the old protocol stack for uplink and downlink data cached at the first access network device.

In such a manner, according to the handover method in the embodiment of the disclosure, the sequence of the data packets is continued to be maintained by use of the old protocol stack before the first access network device triggers the terminal device and/or the second access network device to completely use the new protocol stack, so that data of the terminal device may be timely processed, and a data transmission delay of the terminal device in a handover process is reduced.

Optionally, in the embodiment of the disclosure, the first access network device may trigger a first terminal device only. For example, when the first terminal device moves to a coverage of the second access network device connected with a second terminal device and the first terminal device may form a D2D connection with the second terminal device, the first network device may trigger the first terminal device, and the first terminal device may trigger the second network device through the second terminal device to set up the new protocol stack.

Optionally, in the embodiment of the disclosure, the first access network device may also trigger the second access network device only. For example, when the first terminal device moves to the coverage of the second access network device connected with the second terminal device and the first terminal device may form the D2D connection with the second terminal device, the first network device may trigger the second network device, and the second network device may trigger the first terminal device through the second terminal device to set up the new protocol stack.

Optionally, in the embodiment of the disclosure, the operation that the first access network device triggers the terminal device and the second access network device to configure the second protocol stack includes the following actions. The first access network device sends a first triggering information to the second access network device, the first triggering information being configured to request the second access network device to configure the second protocol stack. The first access network device receives response information of the first triggering information sent by the second access network device. The first access network device sends a second triggering information to the terminal device according to the response information, the second triggering information being configured to instruct the terminal device to configure the second protocol stack.

Specifically, reference may be made to 4 to 7 as shown in FIG. 3. For example, the first access network device may send a handover request to the second access network device. The second access network device, after determining according to the handover request that the terminal device is allowed to be handed over to the second access network device, may return a response to the handover request to the first access network device, and the response may contain various parameters configured for the terminal device by the second access network device. The first access network device may directly transparently transmit various parameters configured by the second access network device to the terminal device, and the terminal device may further configure a protocol stack for communication with the second access network device according to these parameters.

It is to be understood that, when the first access network device triggers the terminal device to configure the new protocol stack, the first access network device may simultaneously notify the terminal device to maintain a connection with the first access network device. For example, indication information may be contained in the handover command sent by the first access network device to the terminal device, and the indication information may directly instruct the terminal device to keep the connection with the first access network device. Alternatively, the first access network device may separately send indication information to the terminal device to notify the terminal device to keep the connection with the first access network device after receiving the handover command sent by the first access network device.

It is also to be understood that, when the first access network device triggers the terminal device to use the new protocol stack, the first access network device may simultaneously notify the terminal device to cut off the connection with the first access network device, namely releasing the old protocol stack. For example, the first access network device may separately send indication information to the terminal device, and the indication information may directly instruct the terminal device to cut off the connection with the first access network device. Alternatively, the first access network device may also contain a bit in a last data packet sent to the terminal device to instruct the terminal device to cut off the connection with the first access network device.

Optionally, in the embodiment of the disclosure, the data packets to be processed include first data packets, and the operation that the first access network device sequentially processes the data packets to be processed between the first access network device and the terminal device by use of the first protocol stack before the first access network device triggers the terminal device and/or the second access network device to maintain the sequence of the data packets of the terminal device by use of the second protocol stack includes the following actions. Before the first access network device triggers the terminal device and/or the second access network device to maintain the sequence of the data packets of the terminal device by use of the second protocol stack, the first access network device receives the first data packets sent by the terminal device. The first access network device decrypts the first data packets or a data part in each of the first data packets by use of the first protocol stack. The first access network device sequentially processes the decrypted first data packets by use of the first protocol stack.

Two embodiments of the single-connection handover scenario and the multi-connection role switching scenario will be described below in detail in combination with FIG. 5 and FIG. 6, respectively.

Figure 5:
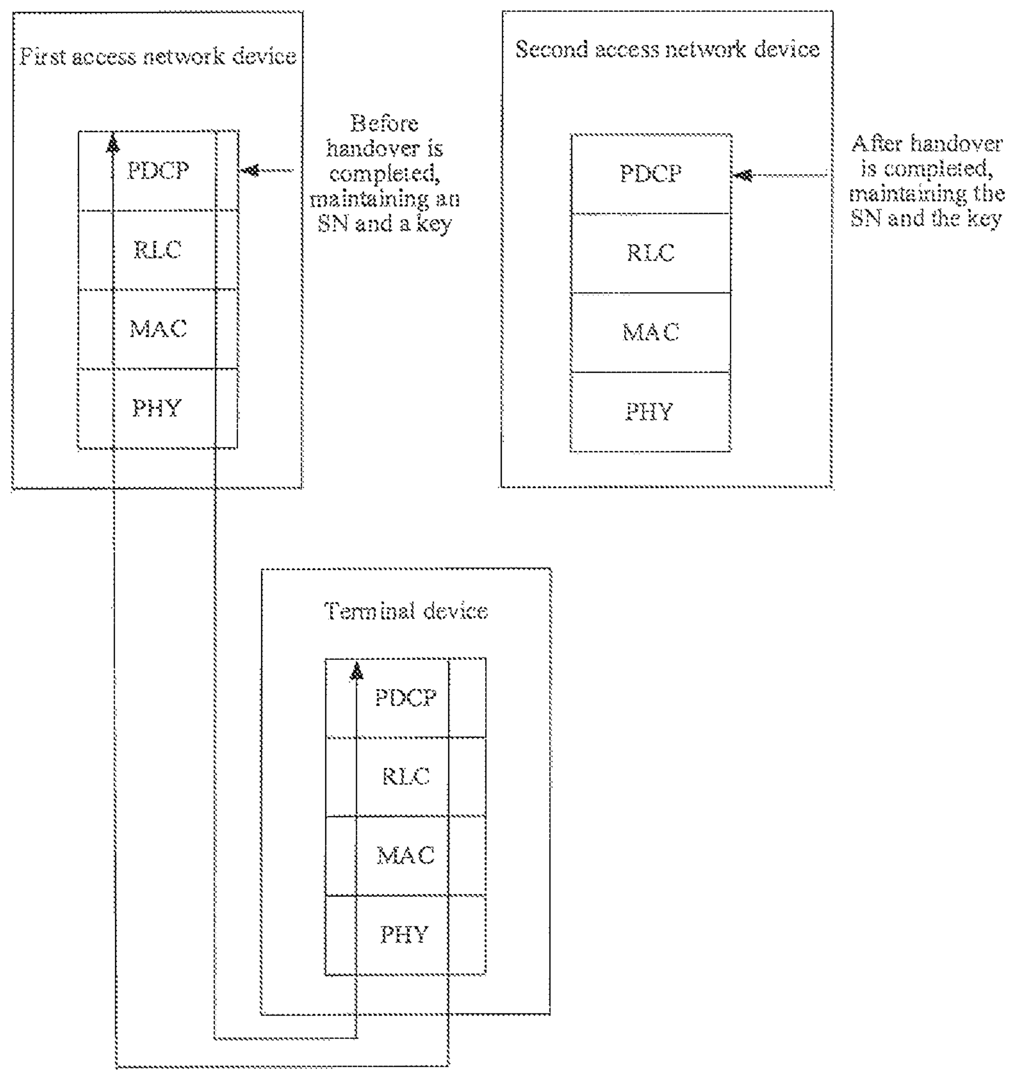
FIG. 5 is a block diagram showing an implementation of a protocol stack for a handover method according to an embodiment of the disclosure.

FIG. 5 illustrates the single-connection handover scenario. As shown in FIG. 5, in a first stage (which may be considered to be the stage before step 7 in FIG. 3), the first access network device provides network service for the terminal device, that is, a PDCP layer of the first access network device serves as a convergence layer to maintain a sending/receiving sequence (SN in LTE) of the data packets of the terminal device, and the PDCP layer of the first access network device also maintains a unified security key for the terminal device. For uplink data, a specific flow may be as follows. The terminal device sends a PDCP PDU to the first access network device (the terminal device is required to sequence SDUs in the PDCP PDU at first, namely adding an SN, and the terminal device may further encrypts the sequenced PDCP PDUs or the SDUs therein). The PDCP layer of the first access network device, after receiving the PDCP PDUs from an RLC layer, decrypts the PDCP PDUs at first or may also decrypt the SDU in the PDCP PDU. Furthermore, the first access network device may sequence the received PDCP PDUs or SDUs according to the SN obtained by decryption.

In a second stage (which may be considered to be the stage between 7 and 11 in FIG. 3), i.e., the handover execution process in FIG. 3, during this period, the terminal device may keep the connection with the first access network device, that is, the terminal device may not leave a source cell in a process of synchronization with the second access network device, and in such case, if the terminal device has data required to be transmitted, the terminal device may still transmit the data to the first access network device. That is, the first access network device may also receive a PDCP PDU sent by the terminal device (the terminal device is required to sequence SDUs in the PDCP PDU at first, namely adding an SN, and the terminal device may further encrypt the sequenced PDCP PDUs or the SDUs therein), the PDCP layer of the first access network device, after receiving the PDCP PDUs from the RLC layer, decrypts the PDCP PDUs at first or may also decrypt the SDU in the PDCP PDU, and furthermore, the first access network device may sequence the received PDCP PDUs or SDUs according to the SN obtained by decryption. In other words, in this stage, data is still transmitted between the terminal device and the first access network device.

In a third stage (which may be considered as a flow after 11 in FIG. 3), i.e., a handover completion process in FIG. 3, during this period, since the terminal device has completed reconfiguration with the second access network device, in other words, the terminal device has been able to communicate with the second access network device, the terminal device may certainly directly send a PDCP PDU to the second access network device. Similarly, the second access network device, after receiving the PDCP PDU sent by the terminal device, may decrypt the PDCP PDU or an SDU therein through a newly set-up PDCP layer thereof, thereby sequentially submitting the PDCP PDUs or the SDUs to an upper layer according to acquired SNs.

Functions of a PDCP and how to use these functions of the PDCP will not be introduced herein in detail and may refer to an LTE protocol.

Figure 6:
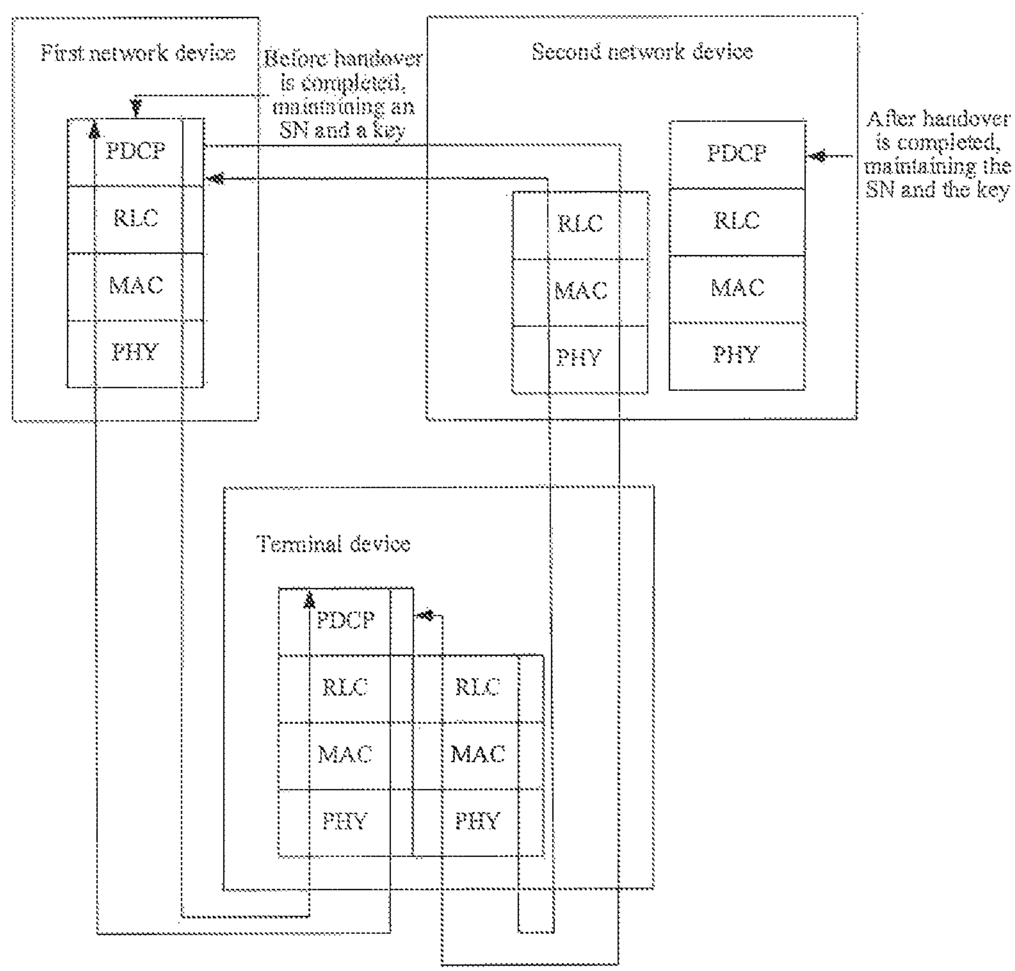
FIG. 6 is a block diagram showing another implementation of a protocol stack for a handover method according to an embodiment of the disclosure.

FIG. 6 illustrates a multi-connection role switching scenario. As shown in FIG. 6, in a first stage (which may be considered to be the stage before 7 in FIG. 3), the first access network device and the second access network device jointly provide network services for the terminal device. The first access network device may be a primary access network device and the second access network device may be a secondary access network device. The terminal device may send a PDCP PDU to a network device side through the first access network device and the second access network device. On the network device side, the PDCP layer of the first access network device serves as a convergence layer to maintain a sending/receiving sequence (SN in LTE) of the data packets of the terminal device, and meanwhile, the PDCP layer of the first access network device maintains a unified key for the terminal device. For uplink data, a specific flow may be as follows. The terminal device sends a PDCP PDU to the first access network device and the second access network device (the terminal device is required to sequence SDUs in the PDCP PDU at first, namely adding SNs, the terminal device may further encrypt the sequenced PDCP PDUs or the SDU therein and the terminal device may further send the encrypted PDCP PDUs to the network device side through the RLC layer of the first access network device and an RLC layer of the second access network device respectively). The PDCP layer of the first access network device, after receiving the PDCP PDUs from the RLC layer of the first access network device and the RLC layer of the second access network device, decrypts the PDCP PDUs at first or may also decrypt the SDU in the PDCP PDU. Furthermore, the first access network device may sequence the received PDCP PDUs or SDUs according to the SNs obtained by decryption.

In a second stage (which may be considered to be the stage between 7 and 11 in FIG. 3), i.e., the handover execution process in FIG. 3, during this period, the terminal device may keep the connection with the first access network device, that is, in the process of synchronizing the terminal device with the second access network device, the PDCP of the first access network device may still be used to maintain a sending/receiving sequence of data of the terminal device and the key of the data. In such case, if the terminal device has data required to be transmitted, the terminal device may still transmit the data to the first access network device and/or transmit the data to the second access network device. However, the data may finally be processed by the PDCP layer of the first access network device. In other words, during this period, the network device may still process the data through the old protocol stack.

It is to be understood that the data transmitted in the first stage and the second stage may be transmitted through two links in dual connections and may also be transmitted through one link therein. However, no matter whether being transmitted through one link or two links, the data is finally converged into the PDCP layer of the first access network device, i.e., the PDCP layer of the primary access network device in a dual-connection scenario.

In a third stage (which may be considered as a flow after 11 in FIG. 3), i.e., the handover completion process in FIG. 3, during this period, since the terminal device has completed reconfiguration with the second access network device, in other words, the second access network device has completed configuration of the PDCP layer, the terminal device may directly communicate with the second access network device, that is, the network device side may decrypt a PDCP PDU sent by the terminal device or an SDU therein through the PDCP layer of the second access network device. Furthermore, the PDCP layer of the second access network device may sequentially submit the PDCP PDUs or the SDUs to the upper layer according to acquired SNs.

Optionally, in the third stage, namely after handover is completed, the first access network device may only release the functions of the PDCP layer, that is, after handover, the first access network device may serve as a secondary access network device of the second access network device. The terminal device may send data to the network device side through two links, and the data on the two links is finally converged to the newly set-up PDCP layer of the second access network device. The set-up PDCP layer of the second access network device decrypts the data and sequentially submits it to the upper layer according to an SN obtained by decryption.

Optionally, in the third stage, namely after the handover is completed, the first access network device may completely release the connection with the terminal device, and the terminal device may transmit data through the link with the second access network device only. Moreover, the PDCP layer established by the second access network device decrypts the data and sequentially submits the data to the upper layer according to an SN obtained by decryption.

Although descriptions are made herein with dual connections as an example, the embodiment of the disclosure is not limited thereto. A multi-connection circumstance may also exist, that is, a primary access network device and multiple secondary access network devices provide network service for the terminal device together.

Application of the technical solution of the embodiment of the disclosure to the single-connection handover scenario and the multi-connection role switching scenario are described above with uplink data as an example. The technical solution is also applied to downlink data.

Optionally, in the embodiment of the disclosure, the PDCP PDUs to be processed may include second PDCP PDUs, and the operation that the first access network device sequentially processes the PDCP PDUs to be processed between the first access network device and the terminal device by use of the first protocol stack before the first access network device triggers the terminal device and/or the second access network device to maintain the sequence of the PDCP PDUs of the terminal device by use of the second protocol stack includes the following actions. Before the first access network device triggers the terminal device and/or the second access network device to maintain the sequence of the PDCP PDUs of the terminal device by use of the second protocol stack, the first access network device receives the second PDCP PDUs sent by a core network device, and the first access network device sequentially processes the second PDCP PDUs by use of the first protocol stack. The method further includes the following operation. The first access network device encrypts the sequentially processed second PDCP PDUs or an SDU in each of the second PDCP PDUs by use of the first protocol stack.

Transmission of the downlink data may refer to that of the uplink data. For simplicity, no more elaborations will be made herein.

Optionally, in the embodiment of the disclosure, the PDCP PDUs to be processed include third PDCP PDUs, and the operation that the first access network device sequentially processes the PDCP PDUs to be processed between the first access network device and the terminal device by use of the first protocol stack before the first access network device triggers the terminal device and/or the second access network device to maintain the sequence of the PDCP PDUs of the terminal device by use of the second protocol stack includes the following actions. Before the first access network device triggers the terminal device and/or the second access network device to maintain the sequence of the PDCP PDUs of the terminal device by use of the second protocol stack, the first access network device receives the third PDCP PDUs sent by the second access network device, and the third PDCP PDUs or an SDU in the third PDCP PDU has being decrypted by the second access network device by use of the second protocol stack. The first access network device sequentially processes the decrypted third PDCP PDUs.

Optionally, in the embodiment of the disclosure, the PDCP PDUs to be processed include fourth data packets, and the operation that the first access network device sequentially processes the PDCP PDUs to be processed between the first access network device and the terminal device by use of the first protocol stack before the first access network device triggers the terminal device and/or the second access network device to maintain the sequence of the PDCP PDUs of the terminal device by use of the second protocol stack includes the following actions. Before the first access network device triggers the terminal device and/or the second access network device to maintain the sequence of the PDCP PDUs of the terminal device by use of the second protocol stack, the first access network device receives the fourth PDCP PDUs sent by the core network device, and the first access network device sequentially processes the fourth PDCP PDUs by use of the first protocol stack. The method further includes the following operation. The first access network device sends the sequentially processed fourth PDCP PDUs to the second access network device, such that the second access network device to encrypt the sequentially processed fourth PDCP PDUs or an SDU in each of the fourth PDCP PDUs by use of the second protocol stack.

It is to be understood that PDCP PDUs appearing herein refers to data packets in some places and refer to a data part in each of the data packets in some places, and those skilled in the art should distinguish them. For example, for uplink data, the terminal device sequentially processes the data to generate data packets and sends the data packets to the network device, and the terminal device does not directly process the data packets. For another example, for downlink data, the access network device obtains the data from the core network device, and the access network device sequentially processes the received downlink data to generate data packets and sends them to the terminal device.

Other two embodiments of the single-connection handover scenario and the multi-connection role switching scenario will be described below in combination with FIG. 7 and FIG. 8 in detail.

Figure 7:
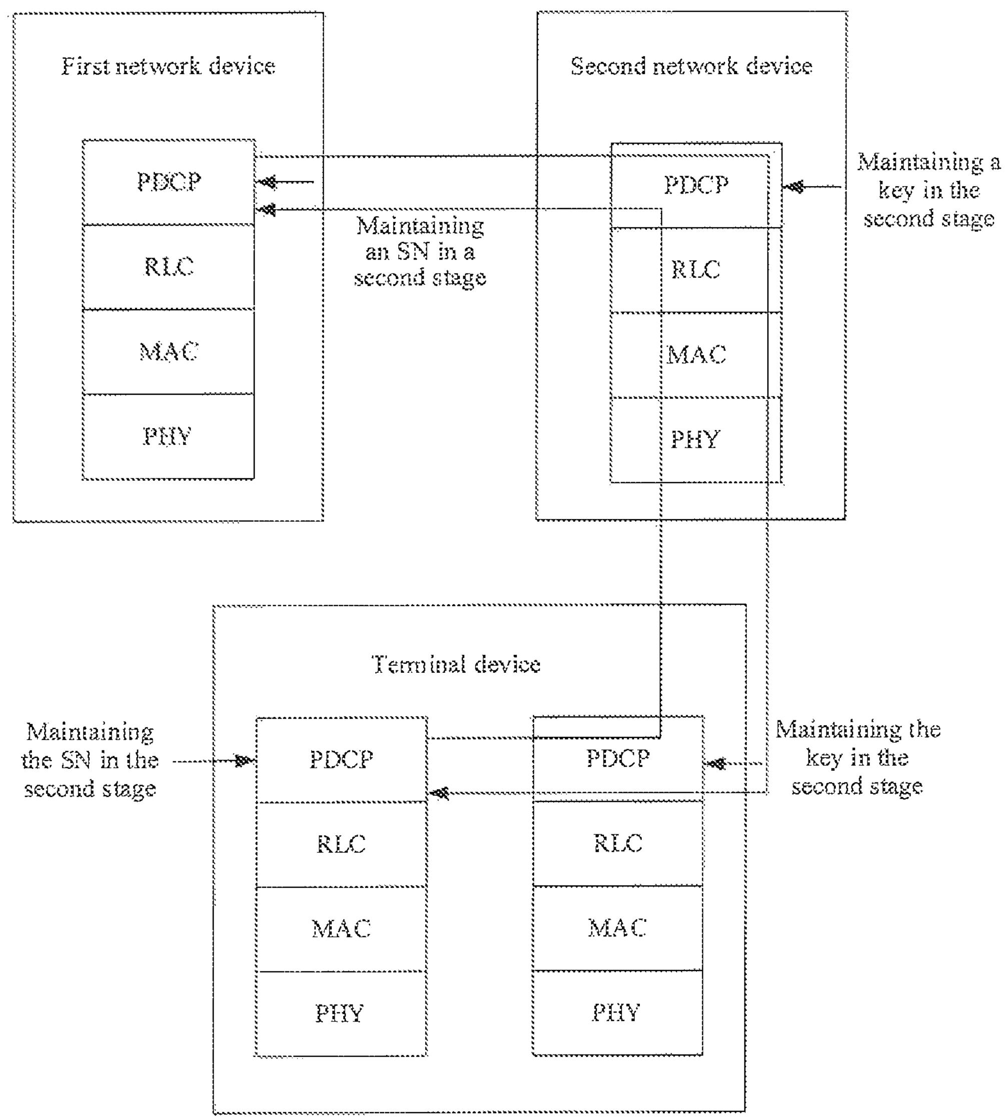
FIG. 7 is a block diagram showing yet another implementation of a protocol stack for a handover method according to an embodiment of the disclosure.

FIG. 7 illustrates the single-connection handover scenario. As shown in FIG. 7, in a first stage (which may be considered to be the stage before 7 in FIG. 3), the first access network device provides network service for the terminal device, that is, the PDCP layer of the first access network device serve as the convergence layer to maintain a sending/receiving sequence (SN in LTE) of the data packets of the terminal device, and the PDCP layer of the first access network device also maintains a unified key for the terminal device. For uplink data, a specific flow may be as follows. The terminal device sends a PDCP PDU to the first access network device (the terminal device is required to sequence SDUs in the PDCP PDU at first, namely adding an SN, and the terminal device may further encrypts the sequenced PDCP PDUs or the SDUs therein). The PDCP layer of the first access network device, after receiving the PDCP PDUs from an RLC layer, decrypts the PDCP PDUs at first or may also decrypt the SDU in the PDCP PDU. Furthermore, the first access network device may sequence the received PDCP PDUs or SDUs according to the SN obtained by decryption.

In a second stage (which may be considered to be the stage between 7 and 11 in FIG. 3), i.e., the handover execution process in FIG. 3, during this period, the terminal device may keep the connection with the first access network device, that is, the terminal device may not leave a source cell in a process of synchronization with the second access network device, and part of the PDCP functions of the network device may be transferred to the second protocol stack, that is, the set-up PDCP layer of the second access network device may maintain the key for the terminal device. In such case, if the terminal device has data to be transmitted, the terminal device may transmit the data to the second access network device by use of the second protocol stack. The second access network device decrypts the received data and, after completing decryption, sends the data to the first access network device for sequential submission. That is, a received PDCP PDU may be decrypted through the PDCP layer of the second access network device, but final sequential submission is implemented through the PDCP layer of the first access network device. In other words, in this stage, the data may be decrypted by use of the new protocol stack, but the data is still sequentially processed by use of the old protocol stack.

In a third stage (which may be considered as a flow after 11 in FIG. 3), i.e., the handover completion process in FIG. 3, during this period, since the terminal device has completed reconfiguration with the second access network device, in other words, a sequencing and submission function for maintaining the data of the terminal device has been transferred from the first access network device to the second access network device, the terminal device may certainly directly send a PDCP PDU to the second access network device. The second access network device, after receiving the PDCP PDU sent by the terminal device, may decrypt the PDCP PDU or an SDU therein through the newly set-up PDCP layer thereof, thereby sequentially submitting the PDCP PDUs or the SDUs to the upper layer according to acquired SNs.

Figure 8:
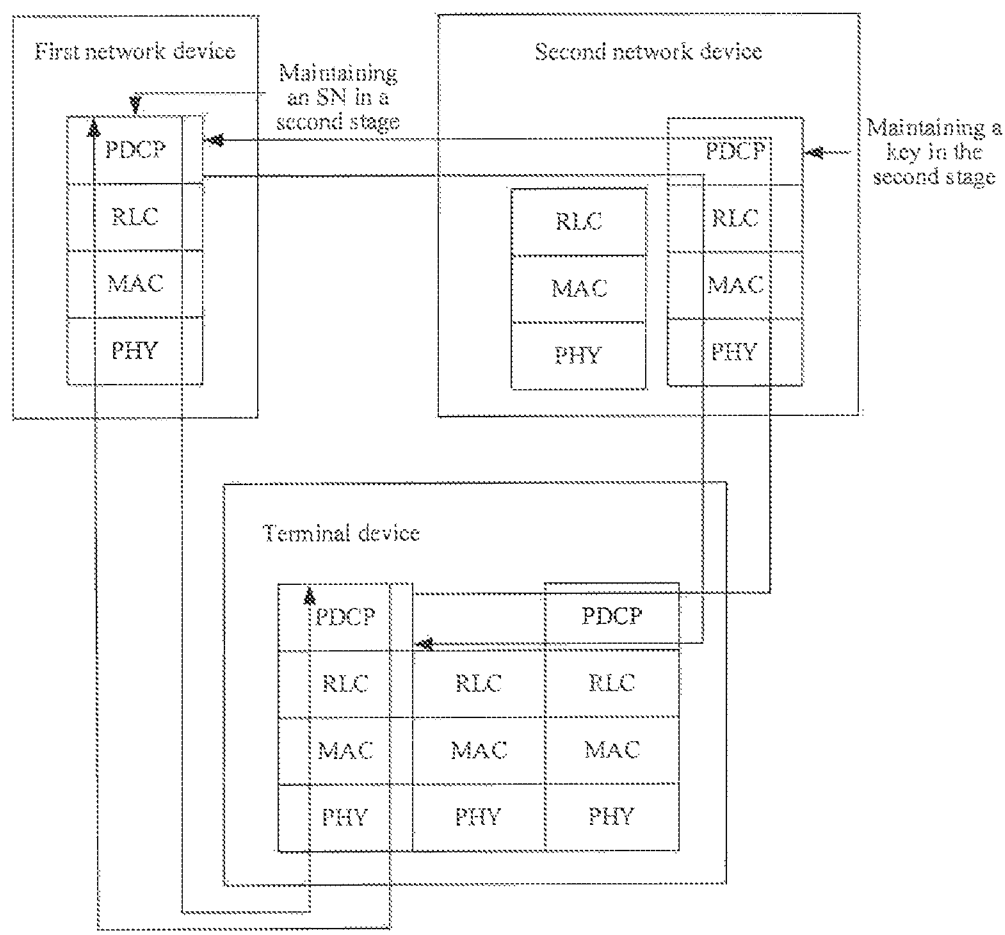
FIG. 8 is a block diagram showing still another implementation of a protocol stack for a handover method according to an embodiment of the disclosure.

FIG. 8 is illustrates a multi-connection role switching scenario. As shown in FIG. 8, in a first stage (which may be considered to be the stage before 7 in FIG. 3), the first access network device and the second access network device provide network service together for the terminal device. The first access network device may be a primary access network device and the second access network device may be a secondary access network device. The terminal device may send a PDCP PDU to a network device side through the first access network device and the second access network device. On the network device side, the PDCP layer of the first access network device serves as a convergence layer to maintain a sending/receiving sequence (SN in LTE) of the data packets of the terminal device, and meanwhile, the PDCP layer of the first access network device also maintains a unified key for the terminal device. For uplink data, a specific flow may be as follows. The terminal device sends a PDCP PDU to the first access network device and the second access network device (the terminal device is required to sequence SDUs in the PDCP PDU at first, namely adding an SN, the terminal device may further encrypt the sequenced PDCP PDUs or the SDUs therein and the terminal device may further send the encrypted PDCP PDUs to the network device side through an RLC layer of the first access network device and an RLC layer of the second access network device respectively). The PDCP layer of the first access network device, after receiving the PDCP PDUs from the RLC layer of the first access network device and the RLC layer of the second access network device, decrypts the PDCP PDUs at first or may also decrypt the SDU in the PDCP PDU. Furthermore, the first access network device may sequence the received PDCP PDUs or SDUs according to the SN obtained by decryption.

In a second stage (which may be considered to be the stage between 7 and 11 in FIG. 3), i.e., the handover execution process in FIG. 3, during this period, the terminal device may keep the connection with the first access network device, that is, in the process of synchronizing the terminal device with the second access network device, a sending/receiving sequence of data of the terminal device is maintained through the PDCP of the first access network device, and the key for the data is maintained through the newly set-up PDCP. In such case, if the terminal device has data required to be transmitted, the terminal device may still transmit the data to the first access network device and/or transmit the data to the second access network device. However, the data may finally be decompressed through the set-up PDCP layer of the second access network device, and the data is sequentially processed through the PDCP layer of the first access network device. In other words, during this period, the network device still processes the data through both the old protocol stack and the new protocol stack.

It is to be understood that the data transmitted in the first stage and the second stage may be transmitted through two links in dual connections and may also be transmitted through one link therein. However, no matter whether being transmitted through one link or two links, the data is finally converged into the PDCP layer of the first access network device, i.e., the PDCP layer of the primary access network device in a dual-connection scenario.

In a third stage (which may be considered as a flow after 11 in FIG. 3), i.e., the handover completion process in FIG. 3, during this period, since the terminal device has completed reconfiguration with the second access network device, in other words, the second access network device has completed configuration of the PDCP layer, the terminal device may directly communicate with the second access network device. That is, the network device side may decrypt a PDCP PDU sent by the terminal device or an SDU therein through the PDCP layer of the second access network device. Furthermore, the PDCP layer of the second access network device may sequentially submit the PDCP PDUs or the SDUs to the upper layer according to an acquired SN.

Transmission of downlink data may refer to that of uplink data. For simplicity, no more elaborations will be made herein.

It is to be understood that, in each embodiment in FIG. 5 to FIG. 8, the PDCP configured to maintain the sequence of the PDCP PDUs of the terminal device in the second stage may be a PDCP entity in the first access network device, and may also be a unified convergence layer outside the PDCP entity and the unified convenience layer may be connected with the PDCP entity of the first access network device and a PDCP entity of the second access network device respectively. That is, the convergence layer outside the PDCP entity of the first access network device rather than the PDCP entity may be utilized in the second stage. The embodiment of the disclosure is not limited thereto.

It is also to be understood that the data may be divided into two parts for data transmission in the second stage. One part of the data is decrypted by use of the new protocol stack and the other part is decrypted by use of the old protocol stack, or the new protocol stack or the old protocol stack may be independently adopted for decryption. There are no limits made thereto in the embodiment of the disclosure.

Optionally, in the embodiment of the disclosure, the method further includes the following operation. In the event that the first access network device determines that no data or data packet of the terminal device is required to be processed by the first access network device, the first access network device triggers the terminal device and/or the second access network device to maintain the sequence of the data packets of the terminal device by use of the second protocol stack.

Specifically, in the flow shown in FIG. 3, the core network device, after completing switching of the downlink path, may send an end marker to the first access network device to notify the first access network device that there will be no data to be sent to the first access network device. Then, the first access network device may convey this circumstance to the terminal device and/or the second access network device respectively, namely notifying the terminal device and/or the second access network device that the terminal device and the second access network device may directly communicate with each other and the first access network device is not required for transmission anymore. For example, the end marker may be "end marker" in 16 and may also be other indication information.

That is, when the terminal device receives indication information sent by the first access network device, the terminal device may determine that there is no data to be transmitted with the first access network device, and the terminal device may directly perform subsequent data transmission by use of the new protocol stack. The terminal device may also release the old protocol stack according to the indication information.

Optionally, in the embodiment of the disclosure, the indication information sent by the first access network device to the terminal device may be any one of RRC signaling, MAC signaling, DCI or a bit in a data packet.

Optionally, in the embodiment of the disclosure, the method further includes the following operations. The first access network device receives third indication information sent by the second access network device, the third indication information being to indicate that the terminal device has completed configuration of the second protocol stack. The first access network device sends path switch information to the core network device according to the third indication information, the path switch information being configured to instruct the core network device to switch an access network device, which is responsible for maintaining the sequence of the data packets of the terminal device, from the first access network device to the second access network device.

That is, after the second access network device determines that the terminal device has completed configuration, the second access network device may trigger the first access network device to send the path switch information for switching the downlink path to the core network device. For example, after the second access network device receives the reconfiguration complete message as shown in FIG. 3, the second access network device sends indication information to the first access network device to notify the first access network device that the terminal device has completed configuration of the new protocol stack. The first access network device may notify the core network device to switch the downlink path. After the second access network device receives the reconfiguration complete message as shown in FIG. 3, the second access network device may directly notify the core network device to switch the downlink path.

Optionally, in the embodiment of the disclosure, the first access network device is a source access network device, and the second access network device is a target access network device. Alternatively, the first access network device is a primary access network device in a multi-connection scenario, and the second access network device is a secondary access network device in the multi-connection scenario.

Figure 9:
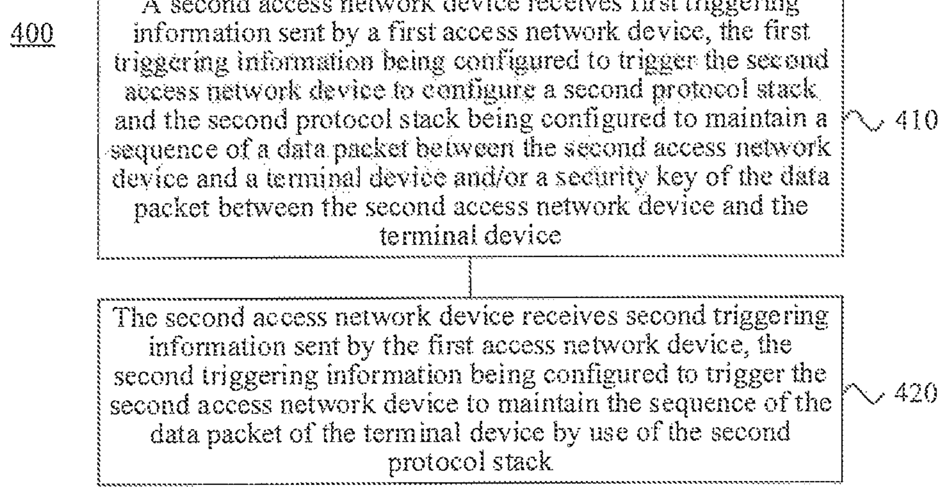
FIG. 9 is another schematic block diagram of a handover method according to an embodiment of the disclosure.

FIG. 9 is a schematic block diagram showing a handover method 400 according to an embodiment of the disclosure. As shown in FIG. 9, the method 400 includes the following operations.

At S410, a second access network device receives first triggering information sent by a first access network device, the first triggering information being configured to trigger the second access network device to configure a second protocol stack and the second protocol stack being configured to maintain a sequence of data packets between the second access network device and a terminal device and/or a security key of the data packets between the second access network device and the terminal device.

At S420, the second access network device receives second triggering information sent by the first access network device, the second triggering information being configured to trigger the second access network device to maintain the sequence of the data packets of the terminal device by use of the second protocol stack.

In such a manner, according to the handover method in the embodiment of the disclosure, the sequence of the data packets is continued to be maintained by the old protocol stack before the first access network device triggers the terminal device and/or the second access network device to completely use the new protocol stack, so that data of the terminal device may be timely processed, and a data transmission delay of the terminal device in a handover process is reduced.

Optionally, in the embodiment of the disclosure, the method further includes the following operations. Before the second access network device receives the second triggering information sent by the first access network device, the second access network device receives a sequentially processed and encrypted first data packets sent by the first access network device, and the second access network device forwards the sequentially processed and encrypted first data packets to the terminal device.

Optionally, in the embodiment of the disclosure, the method further includes the following operations. Before the second access network device receives the second triggering information sent by the first access network device, the second access network device receives a sequentially processed second data packets sent by the first access network device, the second access network device encrypts the second data packets or a data part in each of the second data packets by use of the second protocol stack, and the second access network device sends the encrypted second data packets to the terminal device.

Optionally, in the embodiment of the disclosure, the method further includes the following operations. Before the second access network device receives the second triggering information sent by the first access network device, the second access network device receives third data packets sent by the terminal device, and the second access network device forwards the third data packets to the first access network device for the first access network device to decrypt and sequentially process the third data packets or a data part in each of the third data packets.

Optionally, in the embodiment of the disclosure, the method further includes the following operations. Before the second access network device receives the second triggering information sent by the first access network device, the second access network device receives fourth data packets sent by the terminal device, the second access network device decrypts the fourth data packets or a data part in each of the fourth data packets by use of the second protocol stack, and the second access network device sends the decrypted fourth data packets to the first access network device for the first access network device to sequentially process the decrypted fourth data packets.

Optionally, in the embodiment of the disclosure, the method further includes the following operations. The second access network device receives first indication information sent by the terminal device, the first indication information being to indicate that the terminal device has completed configuration of the second protocol stack. The second access network device sends path switch information to a core network device according to the first indication information, or the second access network device triggers the first access network device to send the path switch information to the core network device according to the first indication information, the path switch information being configured to instruct the core network device to switch an access network device, which is responsible for maintaining the sequence of the data packets of the terminal device, from the first access network device to the second access network device.

Optionally, in the embodiment of the disclosure, the method further includes the following operations. After the second access network device sends the path switch information to the core network device, the second access network device receives second indication information sent by the first access network device, the second indication information being configured to indicate that no data or data packet of the terminal device is required to be processed by the first access network device.

Optionally, in the embodiment of the disclosure, the second triggering information may be any one of RRC signaling, MAC signaling, DCI or a bit in a data packet.

Optionally, in the embodiment of the disclosure, the first access network device is a source access network device, and the second access network device is a target access network device. Alternatively, the first access network device is a primary access network device in a multi-connection scenario, and the second access network device is a secondary access network device in the multi-connection scenario.

It is to be understood that interactions between the second access network device and each of the first access network device and the terminal device, related properties, functions and the like described on a second access network device side correspond to related properties and functions of the first access network device. Moreover, the related contents have been described in detail in the method 300 and, for simplicity, will not be elaborated herein.

Figure 10:
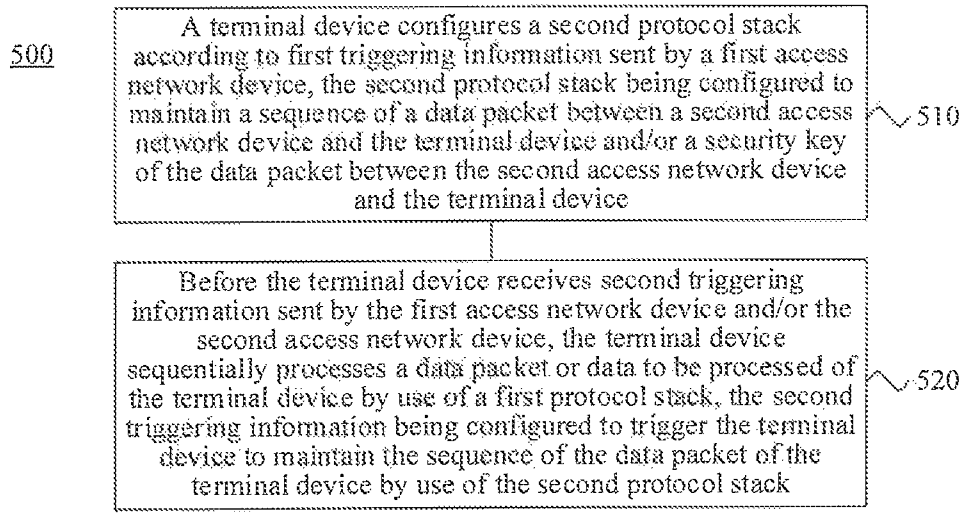
FIG. 10 is yet another schematic block diagram of a handover method according to an embodiment of the disclosure.

FIG. 10 is a schematic block diagram showing a handover method 500 according to an embodiment of the disclosure. As shown in FIG. 10, the method 500 includes the following operations.

At S510, a terminal device configures a second protocol stack according to first triggering information sent by a first access network device, the second protocol stack being configured to maintain a sequence of data packets between a second access network device and the terminal device and/or a security key of the data packets between the second access network device and the terminal device.

At S520, before the terminal device receives second triggering information sent by the first access network device and/or the second access network device, the terminal device sequentially processes data packets or data to be processed of the terminal device by use of a first protocol stack, the second triggering information being configured to trigger the terminal device to maintain the sequence of the data packets of the terminal device by use of the second protocol stack.

In such a manner, according to the handover method in the embodiment of the disclosure, the sequence of the data packets is continued to be maintained by the old protocol stack before the first access network device triggers the terminal device and/or the second access network device to completely use the new protocol stack, so that data of the terminal device may be timely processed, and a data transmission delay of the terminal device in a handover process is reduced.

Optionally, in the embodiment of the disclosure, the data to be processed includes first data, and the operation that the terminal device sequentially processes the data packets or data to be processed of the terminal device by use of the first protocol stack before the terminal device receives the second triggering information sent by the first access network device and/or the second access network device includes the following action. The terminal device sequentially processes the first data by use of the first protocol stack. The method further includes that: the terminal device encrypts the sequentially processed first data or data packets including the first data by use of the first protocol stack, and the terminal device sends the encrypted data packets including the first data to the first access network device and/or the second access network device.

Optionally, in the embodiment of the disclosure, the data packets to be processed include first data packets, and the operation that the terminal device sequentially processes the data packets or data to be processed of the terminal device by use of the first protocol stack before the terminal device receives the second triggering information sent by the first access network device and/or the second access network device includes the following actions. Before the terminal device receives the second triggering information sent by the first access network device and/or the second access network device, the terminal device receives the first data packets sent by the first access network device and/or the second access network device, the terminal device decrypts the first data packets or a data part in each of the first data packets by use of the first protocol stack, and the terminal device sequentially processes the decrypted first data packets by use of the first protocol stack.

Optionally, in the embodiment of the disclosure, the data to be processed includes second data, and the operation that the terminal device sequentially processes the data packets or data to be processed of the terminal device by use of the first protocol stack before the terminal device receives the second triggering information sent by the first access network device and/or the second access network device includes the following action. The terminal device sequentially processes the second data by use of the first protocol stack. The method further includes that: the terminal device encrypts the sequentially processed second data or data packets including the second data by use of the second protocol stack, and the terminal device sends the encrypted data packets including the second data to the second network device.

Optionally, in the embodiment of the disclosure, the data packets to be processed include second data packets, and the operation that the terminal device sequentially processes the data packets or data to be processed of the terminal device by use of the first protocol stack before the terminal device receives the second triggering information sent by the first access network device and/or the second access network device includes the following actions. The terminal device receives the second data packets sent by the second network device, the terminal device decrypts the second data packets or a data part in each of the second data packets by use of the second protocol stack, and the terminal device sequentially processes the decrypted second data packets by use of the first protocol stack.

Optionally, in the embodiment of the disclosure, the method further includes the following operations. The terminal device receives the second triggering information sent by the first access network device and/or the second access network device, and the terminal device maintains the sequence of the data packets of the terminal device by use of the second protocol stack according to the second triggering information.

Optionally, in the embodiment of the disclosure, the second triggering information is further configured to instruct the terminal device to release the first protocol stack. The method may further include that the terminal device releases the first protocol stack according to the second triggering information.

Optionally, in the embodiment of the disclosure, the second triggering information is any one of RRC signaling, MAC signaling, DCI or a bit in a data packet.

Optionally, in the embodiment of the disclosure, the first access network device is a source access network device, and the second access network device is a target access network device. Alternatively, the first access network device is a primary access network device in a multi-connection scenario, and the second access network device is a secondary access network device in the multi-connection scenario.

It is to be understood that terms “system” and “network” are herein often used interchangeably. In the disclosure, term “and/or” is only an association relationship describing associated objects and represents that three relationships may exist. For example, A and/or B may represent three conditions: i.e., independent existence of A, existence of both A and B and independent existence of B. In addition, character “/” in the disclosure usually represents that previous and next associated objects form an “or” relationship.

It is to be understood that interaction between the terminal device and the network device and related properties, functions and the like described on the terminal device correspond to related properties and functions of the network device. Moreover, the related contents have been described in detail in the method 300 and, for simplicity, will not be elaborated herein.

The handover methods according to the embodiments of the disclosure are described above in detail and devices according to the embodiments of the disclosure will be described below in combination with FIG. 11 to FIG. 16. The technical characteristics described in the method embodiments are applied to the following device embodiments.

Figure 11:
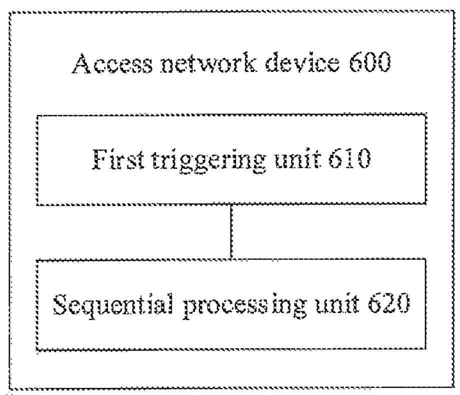
FIG. 11 is a schematic block diagram of an access network device according to an embodiment of the disclosure.

FIG. 11 is a schematic block diagram showing an access network device 600 according to an embodiment of the disclosure. The access network device 600 is a first access network device. As shown in FIG. 11, the access network device 600 includes a first triggering unit 610 and a sequential processing unit 620.

The triggering unit 610 is configured to trigger a terminal device and/or a second access network device to configure a second protocol stack, the second protocol stack being configured to maintain a sequence of PDCP PDUs between the second access network device and the terminal device and/or a security key of the data packets between the second access network device and the terminal device.

The sequential processing unit 620 is configured to, before the first access network device triggers the terminal device and/or the second access network device to maintain the sequence of the data packets of the terminal device by use of the second protocol stack, sequentially process data packets to be processed between the first access network device and the terminal device by use of a first protocol stack.

In such a manner, according to the access network device in the embodiment of the disclosure, the sequence of the data packets is continued to be maintained by the old protocol stack before the first access network device triggers the terminal device and/or the second access network device to completely use the new protocol stack, so that data of the terminal device may be timely processed, and a data transmission delay of the terminal device in a handover process is reduced.

Optionally, in the embodiment of the disclosure, the data packets to be processed include first data packets, and the sequential processing unit 620 is specifically configured to, before the first access network device triggers the terminal device and/or the second access network device to maintain the sequence of the data packets of the terminal device by use of the second protocol stack, receive the first data packets sent by the terminal device, decrypt the first data packets or a data part in each of the first data packets by use of the first protocol stack and sequentially process the decrypted first data packets by use of the first protocol stack.

Optionally, in the embodiment of the disclosure, the data packets to be processed include second data packets, and the sequential processing unit is specifically configured to, before the first access network device triggers the terminal device and/or the second access network device to maintain the sequence of the data packets of the terminal device by use of the second protocol stack, receive the second data packets sent by a core network device and sequentially process the second data packets by use of the first protocol stack. The access network device further includes a first encryption unit, configured to encrypt the sequentially processed second data packets or a data part in each of the second data packets by use of the first protocol stack.

Optionally, in the embodiment of the disclosure, the data packets to be processed include third data packets, and the sequential processing unit is specifically configured to, before the first access network device triggers the terminal device and/or the second access network device to maintain the sequence of the data packets of the terminal device by use of the second protocol stack, receive the third data packets sent by the second access network device, the third data packets or a data part in each of the third data packets being decrypted by the second access network device by use of the second protocol stack, and sequentially process the decrypted third data packets.

Optionally, in the embodiment of the disclosure, the data packets to be processed include fourth data packets, and the sequential processing unit is specifically configured to, before the first access network device triggers the terminal device and/or the second access network device to maintain the sequence of the data packets of the terminal device by use of the second protocol stack, receive the fourth data packets sent by the core network device and sequentially process the fourth data packets by use of the first protocol stack. The access network device further includes a second encryption unit, configured to send the sequentially processed fourth data packets to the second access network device for the second access network device to encrypt the sequentially processed fourth data packets or a data part in each of the fourth data packets by use of the second protocol stack.

Optionally, in the embodiment of the disclosure, the access network device further includes a second triggering unit, configured to, under the circumstance that the first access network device determines that no data packet of the terminal device is required to be processed by the first access network device, trigger the terminal device and/or the second access network device to maintain the sequence of the data packets of the terminal device by use of the second protocol stack.

Optionally, in the embodiment of the disclosure, the second triggering unit is specifically configured to, under the circumstance that the first access network device determines that no data packet of the terminal device is required to be processed by the first access network device, send first indication information to the terminal device, the first indication information being configured to instruct the terminal device to maintain the sequence of the data packets of the terminal device by use of the second protocol stack.

Optionally, in the embodiment of the disclosure, the first indication information is further configured to instruct the terminal device to release the first protocol stack.

Optionally, in the embodiment of the disclosure, the first indication information is any one of RRC signaling, MAC signaling, DCI or a bit in a data packet.

Optionally, in the embodiment of the disclosure, the second triggering unit is specifically configured to, under the circumstance that the first access network device determines that no data packet of the terminal device is required to be processed by the first access network device, send, by the first access network device, second indication information to the second access network device, the second indication information being configured to instruct the second access network device to maintain the sequence of the data packets of the terminal device by use of the second protocol stack.

Optionally, in the embodiment of the disclosure, the access network device further includes a determination unit, configured to determine that no data packet of the terminal device is required to be processed by the first access network device.

Optionally, in the embodiment of the disclosure, the determination unit is specifically configured to receive third indication information sent by the core network device, the third indication information being to indicate that no data packet of the terminal device is required to be processed by the first access network device, and determine according to the third indication information that no data packet of the terminal device is required to be processed by the first network device.

Optionally, in the embodiment of the disclosure, the access network device further includes a receiving unit and a sending unit. The receiving unit is configured to receive fourth indication information sent by the second access network device, the fourth indication information being to indicate that the terminal device has completed configuration of the second protocol stack. The sending unit is configured to send path switch information to the core network device according to the fourth indication information, the path switch information being configured to instruct the core network device to switch an access network device, which is responsible for maintaining the sequence of the data packets of the terminal device, from the first access network device to the second access network device.

Optionally, in the embodiment of the disclosure, the first triggering unit is specifically configured to send first triggering information to the second access network device, the first triggering information being configured to request the second access network device to configure the second protocol stack, receive response information of the first triggering information from the second access network device and send second triggering information to the terminal device according to the response information, the second triggering information being configured to instruct the terminal device to configure the second protocol stack.

Optionally, in the embodiment of the disclosure, the first access network device is a source access network device, and the second access network device is a target access network device. Alternatively, the first access network device is a primary access network device in a multi-connection scenario, and the second access network device is a secondary access network device in the multi-connection scenario.

It is to be understood that the access network device 600 according to the embodiment of the disclosure may correspond to the first access network device in the method embodiment of the disclosure. The abovementioned and other operations and/or functions of each unit in the access network device 600 are intended to implement the corresponding flows executed by the network device in the methods shown in FIG. 4 and FIG. 8 respectively, and will not be elaborated herein for simplicity.

Figure 12:
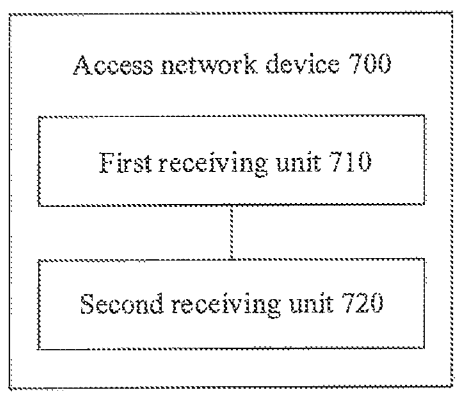
FIG. 12 is another schematic block diagram of an access network device according to an embodiment of the disclosure.

FIG. 12 is a schematic block diagram showing an access network device 700 according to an embodiment of the disclosure. The access network device 700 is a second access network device. As shown in FIG. 12, the access network device 700 includes a first receiving unit 710 and a second receiving unit 720.

The first receiving unit 710 is configured to receive first triggering information sent by a first access network device, the first triggering information being configured to trigger the second access network device to configure a second protocol stack and the second protocol stack being configured to maintain a sequence of data packets between the second access network device and a terminal device and/or a security key of the data packets between the second access network device and the terminal device.

The second receiving unit 720 is configured to receive second triggering information sent by the first access network device, the second triggering information being configured to trigger the second access network device to maintain the sequence of the data packets of the terminal device by use of the second protocol stack.

In such a manner, according to the access network device in the embodiment of the disclosure, the sequence of the data packets is continued to be maintained by the old protocol stack before the first access network device triggers the terminal device and/or the second access network device to completely use the new protocol stack, so that data of the terminal device may be timely processed, and a data transmission delay of the terminal device in a handover process is reduced.

Optionally, in the embodiment of the disclosure, the access network device further includes a third receiving unit and a first sending unit. The third receiving unit is configured to receive, before the second access network device receives the second triggering information sent by the first access network device, a sequentially processed and encrypted first data packets sent by the first access network device. The first sending unit is configured to forward the sequentially processed and encrypted first data packets to the terminal device.

Optionally, in the embodiment of the disclosure, the access network device further includes a fourth receiving unit, a first encryption unit and a second sending unit. The fourth receiving unit is configured to receive, before the second access network device receives the second triggering information sent by the first access network device, a sequentially processed second data packets sent by the first access network device. The first encryption unit is configured to encrypt the second data packets or a data part in each of the second data packets by use of the second protocol stack. The second sending unit is configured to send the encrypted second data packets to the terminal device.

Optionally, in the embodiment of the disclosure, the access network device further includes a fifth receiving unit and a third sending unit. The fifth receiving unit is configured to receive, before the second access network device receives the second triggering information sent by the first access network device, third data packets sent by the terminal device. The third sending unit is configured to forward the third data packets to the first access network device for the first access network device to decrypt and sequentially process the third data packets or a data part in each of the third data packets.

Optionally, in the embodiment of the disclosure, the access network device further includes a sixth receiving unit, a first decryption unit and a fourth sending unit. The sixth receiving unit is configured to receive, before the second access network device receives the second triggering information sent by the first access network device, fourth data packets sent by the terminal device. The first decryption unit is configured to decrypt the fourth data packets or a data part in each of the fourth data packets by use of the second protocol stack. The fourth sending unit is configured to send the decrypted fourth data packets to the first access network device for the first access network device to sequentially process the decrypted fourth data packets.

Optionally, in the embodiment of the disclosure, the access network device further includes a seventh receiving unit and a fifth sending unit. The seventh receiving unit is configured to receive first indication information sent by the terminal device, the first indication information being to indicate that the terminal device has completed configuration of the second protocol stack. The fifth sending unit is configured to send path switch information to a core network device according to the first indication information or trigger the first access network device to send the path switch information to the core network device according to the first indication information, the path switch information being configured to instruct the core network device to switch an access network device, which is responsible for maintaining the sequence of the data packets of the terminal device, from the first access network device to the second access network device.

Optionally, in the embodiment of the disclosure, the access network device further includes an eighth receiving unit. The eighth receiving unit is configured to, after the seventh sending unit sends the path switch information to the core network device, receive, by the second access network device, second indication information sent by the first access network device, the second indication information being to indicate that no data or data packet of the terminal device is required to be processed by the first access network device.

Optionally, in the embodiment of the disclosure, the second triggering information is any one of RRC signaling, MAC signaling, DCI or a bit in a data packet.

Optionally, in the embodiment of the disclosure, the first access network device is a source access network device, and the second access network device is a target access network device. Alternatively, the first access network device is a primary access network device in a multi-connection scenario, and the second access network device is a secondary access network device in the multi-connection scenario.

It is to be understood that the access network device 700 according to the embodiment of the disclosure may correspond to the second access network device in the method embodiment of the disclosure. The abovementioned and other operations and/or functions of each unit in the access network device 700 are intended to implement the corresponding flows executed by the network device in the methods in FIG. 5 and FIG. 9 respectively, and will not be elaborated herein for simplicity.

Figure 13:
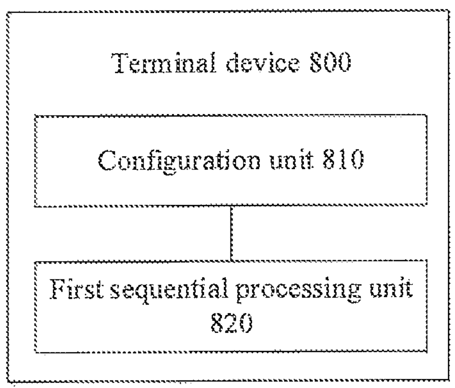
FIG. 13 is a schematic block diagram of a terminal device according to an embodiment of the disclosure.

FIG. 13 is a schematic block diagram showing a terminal device 800 according to an embodiment of the disclosure. As shown in FIG. 13, the terminal device 800 includes a configuration unit $10 and a first sequential processing unit 820.

The configuration unit 810 is configured to configure a second protocol stack according to first triggering information sent by a first access network device, the second protocol stack being configured to maintain a sequence of data packets between a second access network device and the terminal device and/or a security key of the data packets between the second access network device and the terminal device.

The first sequential processing unit $20 is configured to, before the terminal device receives second triggering information sent by the first access network device and/or the second access network device, sequentially process data packets to be processed of the terminal device by use of a first protocol stack, the second triggering information being configured to trigger the terminal device to maintain the sequence of the data packets of the terminal device by use of the second protocol stack.

In such a manner, according to the terminal device of the embodiment of the disclosure, the sequence of the data packets is continued to be maintained by the old protocol stack before the first access network device triggers the terminal device and/or the second access network device to completely use the new protocol stack, so that data of the terminal device may be timely processed, and a data transmission delay of the terminal device in a handover process is reduced.

Optionally, in the embodiment of the disclosure, the data packets to be processed include first data, and the first sequential processing unit is specifically configured to sequentially process the first data by use of the first protocol stack. The terminal device further includes a first encryption unit and a first sending unit. The first encryption unit is configured to encrypt the sequentially processed first data or data packets including the first data by use of the first protocol stack. The first sending unit is configured to send the encrypted data packets including the first data to the first access network device.

Optionally, in the embodiment of the disclosure, the data packets to be processed include first data packets, and the first sequential processing unit is specifically configured to, before the terminal device receives the second triggering information sent by the first access network device and/or the second access network device, receive the first data packets sent by the first access network device, decrypt the first data packets or a data part in each of the first data packets by use of the first protocol stack, and sequentially process the decrypted first data packets by use of the first protocol stack.

Optionally, in the embodiment of the disclosure, the data to be processed includes second data, and the first sequential processing unit is specifically configured to sequentially process the second data by use of the first protocol stack. The terminal device further includes a second encryption unit and a second sending unit. The second encryption unit is configured to encrypt the sequentially processed second data or data packets including the second data by use of the second protocol stack. The second sending unit is configured to send the encrypted data packets including the second data to the second network device.

Optionally, in the embodiment of the disclosure, the data packets to be processed include second data packets, and the first sequential processing unit is specifically configured to receive the second data packets sent by the second network device, decrypt the second data packets or a data part in each of the second data packets by use of the second protocol stack, and sequentially process the decrypted second data packets by use of the first protocol stack.

Optionally, in the embodiment of the disclosure, the terminal device further includes a first receiving unit and a second sequential processing unit. The first receiving unit is configured to receive the second triggering information sent by the first access network device and/or the second access network device. The second sequential processing unit is configured to maintain the sequence of the data packets of the terminal device by use of the second protocol stack according to the second triggering information.

Optionally, in the embodiment of the disclosure, the second triggering information is further configured to instruct the terminal device to release the first protocol stack. The terminal device further includes a release unit, configured to release the first protocol stack according to the second triggering information.

Optionally, in the embodiment of the disclosure, the second triggering information is any one of RRC signaling, MAC signaling, DCI or a hit in a data packet.

Optionally, in the embodiment of the disclosure, the first access network device is a source access network device, and the second access network device is a target access network device. Alternatively, the first access network device is a primary access network device in a multi-connection scenario, and the second access network device is a secondary access network device in the multi-connection scenario.

It is to be understood that the terminal device 800 according to the embodiment of the disclosure may correspond to the terminal device in the method embodiment of the disclosure. The abovementioned and other operations and/or functions of each unit in the terminal device 800 are intended to implement the corresponding flows executed by the terminal device in the methods shown in FIG. 5 to FIG. 8 and FIG. 10 respectively, and will not be elaborated herein for simplicity.

Figure 14:
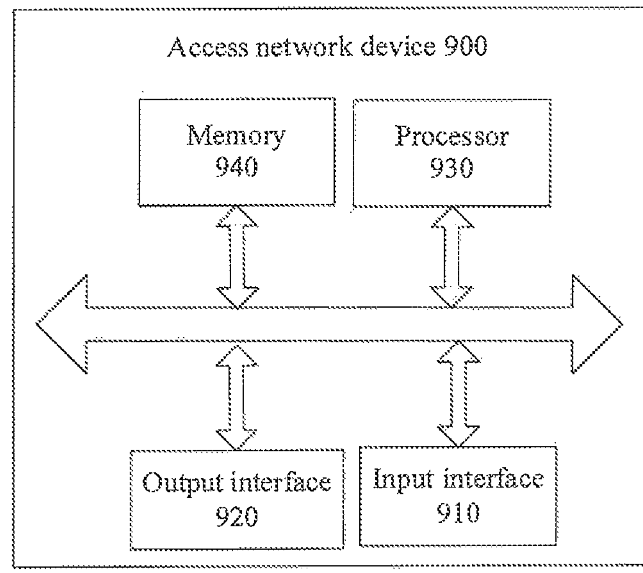
FIG. 14 is yet another schematic block diagram of an access network device according to an embodiment of the disclosure.

As shown in FIG. 14, an embodiment of the disclosure also provides an access network device 900. The access network device 900 may be the access network device 600 in FIG. 11, and may be configured to execute the contents executed by the first access network device in the method 300 in FIG. 4 to FIG. 8. The access network device 900 includes an input interface 910, an output interface 920, a processor 930 and a memory 940. The input interface 910, the output interface 920, the processor 930 and the memory 940 may be connected through a bus system. The memory 940 is configured to store a program, an instruction or a code. The processor 930 is configured to execute the program, instruction or code in the memory 940 to control the input interface 910 to receive a signal, control the output interface 920 to send a signal and complete operations in the method embodiments.

In such a manner, according to the access network device in the embodiment of the disclosure, the sequence of the data packets is continued to be maintained by the old protocol stack before the first access network device triggers the terminal device and/or the second access network device to completely use the new protocol stack, so that data of the terminal device may be timely processed, and a data transmission delay of the terminal device in a handover process is reduced.

It is to be understood that, in the embodiment of the disclosure, the processor 930 may be a Central Processing Unit (CPU), and the processor 930 may also be another universal processor, a Digital Signal Processor (DSP), an Application Specific Integrated Circuit (ASIC), a Field Programmable Gate Array (FPGA) or another programmable logic device, discrete gate or transistor logic device, or discrete hardware component and the like. The universal processor may be a microprocessor or the processor may also be any conventional processor and the like.

The memory 940 may include a Read-Only Memory (ROM) and a Random Access Memory (RAM), and may provide an instruction and data for the processor 930. A portion of the memory 940 may further include a nonvolatile RAM. For example, the memory 940 rummy further store information of a device type.

In an implementation process, the contents of the above methods may be completed by an integrated logic circuit in a hardware form in the processor 930 or an instruction in a software form. The contents of the methods disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 940. The processor 930 reads information in the memory 940 and completes the contents of the method in combination with the hardware thereof. No more detailed descriptions will be made herein to avoid repetitions.

In a specific implementation, the sending unit in the access network device 600 may be implemented by the output interface 920 in FIG. 14 and the receiving unit in the access network device 600 may be implemented by the input interface 910 in FIG. 14. The first triggering unit, the second triggering unit, the sequential processing unit, the determination unit, the first encryption unit and the second encryption unit in the access network device 600 may be implemented by the processor 930 in FIG. 14.

Figure 15:
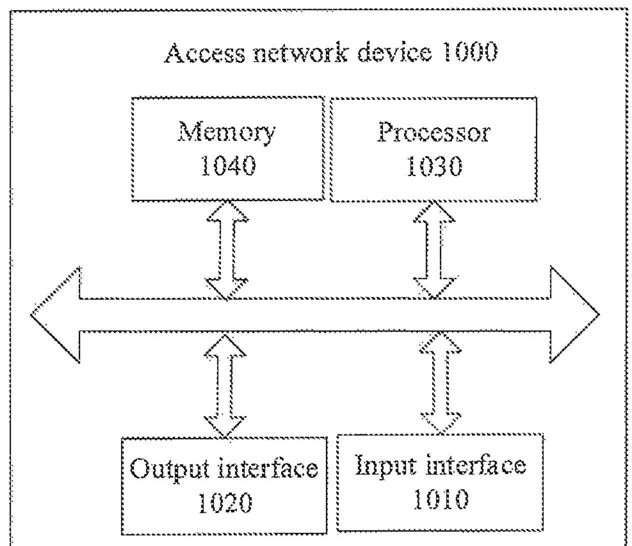
FIG. 15 is still another schematic block diagram of an access network device according to an embodiment of the disclosure.

As shown in FIG. 15, an embodiment of the disclosure further provides an access network device 1000. The access network device 1000 may be the access network device 700 in FIG. 12, and may be configured to execute contents executed by the second access network device in the method 400 in FIG. 5 to FIG. 9. The access network device 1000 includes an input interface 1010, an output interface 1020, a processor 1030 and a memory 1040. The input interface 1010, the output interface 1020, the processor 1030 and the memory 1040 may be connected through a bus system. The memory 1040 is configured to store a program, an instruction or a code. The processor 1030 is configured to execute the program, instruction or code in the memory 1040 to control the input interface 1010 to receive a signal, control the output interface 1020 to send a signal and complete operations in the method embodiments.

In such a manner, according to the access network device in the embodiment of the disclosure, the sequence of the data packets is continued to be maintained by the old protocol stack before the first access network device triggers the terminal device and/or the second access network device to completely use the new protocol stack, so that data of the terminal device may be timely processed, and a data transmission delay of the terminal device in a handover process is reduced.

It is to be understood that, in the embodiment of the disclosure, the processor 1030 may be a CPU, and the processor 1030 may also be another universal processor, a DSP, an ASIC, an FPGA or another programmable logic device, discrete gate or transistor logic device, discrete hardware component and the like. The universal processor may be a microprocessor or the processor may also be any conventional processor and the like.

The memory 1040 may include a ROM and a RAM and may provide an instruction and data for the processor 1030. A portion of the memory 1040 may further include a nonvolatile RAM. For example, the memory 1040 may further store information of a device type.

In an implementation process, the contents of the above methods may be completed by an integrated logic circuit in a hardware form in the processor 1030 or an instruction in a software form. The contents of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 1040. The processor 1030 reads information in the memory 1040 and completes the contents of the method in combination with the hardware thereof. No more detailed descriptions will be made herein to avoid repetitions.

In a specific implementation, the first sending unit to the sixth sending unit in the access network device 700 may be implemented by the output interface 1020 in FIG. 15, and the first receiving unit to the sixth receiving unit in the access network device 700 may be implemented by the input interface 1010 in FIG. 15. The first encryption unit and the first decryption unit in the access network device 700 may be implemented by the processor 1030 in FIG. 15.

Figure 16:
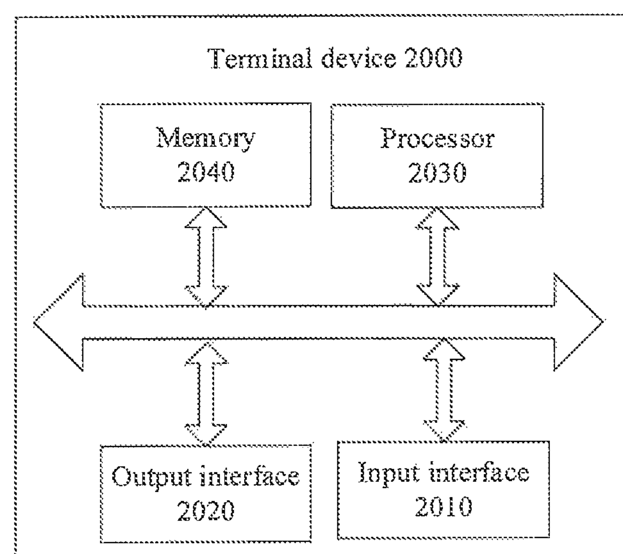
FIG. 16 is another schematic block diagram of a terminal device according to an embodiment of the disclosure.

As shown in FIG. 16, an embodiment of the disclosure also provides a terminal device 2000. The terminal device 2000 may be the terminal device 800 in FIG. 13, and may be configured to execute contents executed by the terminal device in the methods in FIG. 5 to FIG. 8 and FIG. 10. The terminal device 2000 includes an input interface 2010, an output interface 2020, a processor 2030 and a memory 2040. The input interface 2010, the output interface 2020, the processor 2030 and the memory 2040 may be connected through a bus system. The memory 2040 is configured to store a program, an instruction or a code. The processor 2030 is configured to execute the program, instruction or code in the memory 2040 to control the input interface 2010 to receive a signal, control the output interface 2020 to send a signal and complete operations in the method embodiments.

In such a manner, according to the terminal device in the embodiment of the disclosure, the sequence of the data packets is continued to be maintained by the old protocol stack before the first access network device triggers the terminal device and/or the second access network device to completely use the new protocol stack, so that data of the terminal device may be timely processed, and a data transmission delay of the terminal device in a handover process is reduced.

It is to be understood that, in the embodiment of the disclosure, the processor 2030 may be a CPU, and the processor 2030 may also be another universal processor, a DSP, an ASIC, an FPGA or another programmable logic device, discrete gate or transistor logic device, discrete hardware component and the like. The universal processor may be a microprocessor or the processor may also be any conventional processor and the like.

The memory 2040 may include a ROM and a RAM, and may provide an instruction and data for the processor 2030. A portion of the memory 2040 may further include a nonvolatile RAM. For example, the memory 2040 may further store information of a device type.

In an implementation process, the contents of the methods may be completed by an integrated logic circuit in a hardware form in the processor 2030 or an instruction in a software form. The contents of the method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 2040. The processor 2030 reads information in the memory 2040 and completes the contents of the method in combination with the hardware thereof. No more detailed descriptions will be made herein to avoid repetitions.

In a specific implementation, the first sending unit and the second sending unit in the terminal device 800 may be implemented by the output interface 2020 in FIG. 16, and the first receiving unit in the terminal device 800 may be implemented by the input interface 2010 in FIG. 16. The configuration unit, the first sequential processing unit, the first encryption unit, the first decryption unit and the second sequential processing unit in the terminal device 800 may be implemented by the processor 2030 in FIG. 16.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may implement the described functions for each specific application by use of different methods, and such implementation shall fall within the scope of the disclosure.

Those skilled in the art may clearly understand that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only a division of logic function, and other division manners may be adopted during practical implementation. For example, multiple units or components may be combined or integrated into another system, or some characteristics may be neglected or not executed. In addition, coupling or direct coupling or communication connection between the components displayed or discussed may be indirect coupling or communication connection implemented through some interfaces, devices or the units, and may be electrical, mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being implemented in form of software functional unit and sold or used as an independent product, the function may also be stored in a computer-readable storage medium.

Based on such an understanding, the technical solutions of the disclosure substantially or parts making contributions to the conventional art or part of the technical solutions may be embodied in form of software product. The computer software product is stored in a storage medium, including a plurality of instructions configured to enable a computer device (which may be a personal computer, a server, a network device or the like) to execute all or part of the steps in each embodiment of the disclosure. The storage medium includes various media capable of storing program codes such as a U disk, a mobile hard disk, a ROM, a RAM, a magnetic disk or an optical disk.

Disclosed above are merely several specific implementations of the disclosure and not intended to limit the scope of protection of the disclosure. Any variations or replacements apparent to those skilled in the art within the technical scope disclosed by the disclosure shall fail within the scope of protection of the disclosure. Therefore, the scope of protection of the disclosure shall be subject to the scope of protection of the claims.

The invention claimed is:

1. A handover method, comprising:

triggering, by a first access network device, at least one of a terminal device or a second access network device to configure a second protocol stack, the second protocol stack being configured to maintain at least one of: a sequence of data packets between the second access network device and the terminal device, or a security key of the data packets between the second access network device and the terminal device; and before the first access network device triggers the at least one of the terminal device or the second access network device to maintain the sequence of the data packets of the terminal device by use of the second protocol stack, sequentially processing, by the first access network device, data packets to be processed of the terminal device by use of a first protocol stack; wherein the data packets to be processed comprise first data packets, and sequentially processing, by the first access network device, the data packets to be processed of the terminal device by use of the first protocol stack before the first access network device triggers the at least one of the terminal device or the second access network device to maintain the sequence of the data packets of the terminal device by use of the second protocol stack comprises:

before the first access network device triggers the at least one of the terminal device or the second access network device to maintain the sequence of the data packets of the terminal device by use of the second protocol stack, receiving, by the first access network device, the first data packets decrypted by the second access network device by use of the second protocol stack from the second access network device; and sequentially processing, by the first access network device, the decrypted first data packets.

2. The method of claim 1, wherein the data packets to be processed comprise second data packets, and sequentially processing, by the first access network device, the data packets to be processed of the terminal device by use of the first protocol stack before the first access network device triggers the at least one of the terminal device or the second access network device to maintain the sequence of the data packets of the terminal device by use of the second protocol stack comprises:

before the first access network device triggers the at least one of the terminal device or the second access network device to maintain the sequence of the data packets of the terminal device by use of the second protocol stack, receiving, by the first access network device, the second data packets sent by the terminal device;

decrypting, by the first access network device, the second data packets or a data part in each of the second data packets by use of the first protocol stack; and sequentially processing, by the first access network device, the decrypted second data packets by use of the first protocol stack.

3. The method of claim 1, wherein the data packets to be processed comprise third data packets, and sequentially processing, by the first access network device, the data packets to be processed of the terminal device by use of the first protocol stack before the first access network device triggers the at least one of the terminal device or the second access network device to maintain the sequence of the data packets of the terminal device by use of the second protocol stack comprises:

before the first access network device triggers the at least one of the terminal device or the second access network device to maintain the sequence of the data packets of the terminal device by use of the second protocol stack, receiving, by the first access network device, a data part in each of the third data packets sent by a core network device, and sequentially processing, by the first access network device, the third data packets by use of the first protocol stack; and the method further comprises:

encrypting, by the first access network device, the sequentially processed third data packets or the data part in each of the third data packets by use of the first protocol stack.

4. The method of claim 1, wherein the data packets to be processed comprise fourth data packets, and sequentially processing, by the first access network device, the data packets to be processed of the terminal device by use of the first protocol stack before the first access network device triggers the at least one of the terminal device or the second access network device to maintain the sequence of the data packets of the terminal device by use of the second protocol stack comprises:

before the first access network device triggers the at least one of the terminal device or the second access network device to maintain the sequence of the data packets of the terminal device by use of the second protocol stack, receiving, by the first access network device, a data part in each of the fourth data packets sent by a core network device, and sequentially processing, by the first access network device, the fourth data packets by use of the first protocol stack; and the method further comprises:

sending, by the first access network device, the sequentially processed fourth data packets to the second access network device, such that the second access network device encrypts the sequentially processed fourth data packets or the data part in each of the fourth data packets by use of the second protocol stack.

5. The method of claim 1, further comprising:

under the condition that the first access network device determines that no data or data packet of the terminal device is required to be processed by the first access network device, triggering, by the first access network device, the at least one of the terminal device or the second access network device to maintain the sequence of the data packets of the terminal device by use of the second protocol stack.

6. The method of claim 5, wherein triggering, by the first access network device, the terminal device to maintain the sequence of the data packets of the terminal device by use of the second protocol stack under the condition that the first access network device determines that no data or data packet of the terminal device is required to be processed by the first access network device comprises:

under the condition that the first access network device determines that no data or data packet of the terminal device is required to be processed by the first access network device, sending, by the first access network device, first indication information to the at least one of the terminal device or the second access network device, the first indication information being configured to instruct the at least one of the terminal device or the second access network device to maintain the sequence of the data packets of the terminal device by use of the second protocol stack.

7. The method of claim 5, further comprising:

determining, by the first access network device, that no data or data packet of the terminal device is required to be processed by the first access network device, wherein determining, by the first access network device, that no data or data packet of the terminal device is required to be processed by the first access network device comprises:

receiving, by the first access network device, second indication information sent by a core network device, the second indication information being to indicate that no data or data packet of the terminal device is required to be processed by the first access network device; and determining, by the first access network device, according to the second indication information that no data or data packet of the terminal device is required to be processed by the first access network device.

8. The method of claim 7, wherein receiving, by the first access network device, the second indication information sent by the core network device comprises:

after the first access network device sends path switch information to the core network device, receiving, by the first access network device, the second indication information sent by the core network device, the path switch information being configured to instruct the core network device to switch an access network device, which is responsible for maintaining the sequence of the data packets of the terminal device, from the first access network device to the second access network device.

9. The method of claim 8, further comprising:

receiving, by the first access network device, third indication information sent by the second access network device, the third indication information being to indicate that the terminal device has completed configuration of the second protocol stack; and sending, by the first access network device, the path switch information to the core network device according to the third indication information.

10. The method of claim 1, wherein triggering, by the first access network device, the terminal device and the second access network device to configure the second protocol stack comprises:

sending, by the first access network device, first triggering information to the second access network device, the first triggering information being configured to request the second access network device to configure the second protocol stack;

receiving, by the first access network device, response information to the first triggering information from the second access network device; and sending, by the first access network device, second triggering information to the terminal device according to the response information, the second triggering information being configured to instruct the terminal device to configure the second protocol stack.

11. A terminal device, comprising:

a processor; and a memory for storing instructions executable by the processor, wherein the processor is configured to execute the instructions to:

configure a second protocol stack according to first triggering information sent by a first access network device, the second protocol stack being configured to maintain at least one of: a sequence of data packets between a second access network device and the terminal device, or a security key of the data packets between the second access network device and the terminal device; and before the terminal device receives second triggering information sent by at least one of the first access network device or the second access network device, sequentially process data packets or data to be processed of the terminal device by use of a first protocol stack, the second triggering information being configured to trigger the terminal device to maintain the sequence of the data packets of the terminal device by use of the second protocol stack, wherein the data to be processed comprises first data, and the processor is specifically configured to:

sequentially process the first data by use of the first protocol stack;

encrypt the sequentially processed first data or data packets comprising the first data by use of the second protocol stack, and send the encrypted data packets comprising the first data to the second network device.

12. The terminal device of claim 11, wherein the data to be processed comprises second data, and the processor is specifically configured to:

sequentially process the second data by use of the first protocol stack;

encrypt the sequentially processed second data or data packets comprising the second data by use of the first protocol stack, and send the encrypted data packets comprising the second data to the first access network device.

13. The terminal device of claim 11, wherein the data packets to be processed comprise first data packets, and the processor is specifically configured to:

before the terminal device receives the second triggering information sent by the at least one of the first access network device or the second access network device, receive the first data packets sent by the first access network device, decrypt the first data packets or a data part in each of the first data packets by use of the first protocol stack, and sequentially process the decrypted first data packets by use of the first protocol stack.

14. The terminal device of claim 11, wherein the data packets to be processed comprise second data packets, and the processor is configured to:

receive the second data packets sent by the second network device, decrypt the second data packets or a data part in each of the second data packets by use of the second protocol stack, and sequentially process the decrypted second data packets by use of the first protocol stack.

15. The terminal device of claim 11, further comprising:

an input interface, configured to receive the second triggering information sent by the at least one of the first access network device or the second access network device; and the processor is further configured to maintain the sequence of the data packets of the terminal device by use of the second protocol stack according to the second triggering information.

16. The terminal device of claim 15, wherein the second triggering information is further configured to instruct the terminal device to release the first protocol stack, and the processor is further configured to release the first protocol stack according to the second triggering information.

17. The terminal device of claim 11, wherein the second triggering information is any one of Radio Resource Control (RRC) signaling, Medium Access Control (MAC) signaling, Downlink Control Information (DCI) or a bit in a data packet.

18. The terminal device of claim 11, wherein the first access network device is a source access network device, and the second access network device is a target access network device; or the first access network device is a primary access network device in a multi-connection scenario, and the second access network device is a secondary access network device in the multi-connection scenario.

19. A handover method, comprising:

configuring, by a terminal device, a second protocol stack according to first triggering information sent by a first access network device, the second protocol stack being configured to maintain at least one of: a sequence of data packets between a second access network device and the terminal device, or a security key of the data packets between the second access network device and the terminal device; and before the terminal device receives second triggering information sent by at least one of the first access network device or the second access network device, sequentially processing, by the terminal device, data packets or data to be processed of the terminal device by use of a first protocol stack, the second triggering information being configured to trigger the terminal device to maintain the sequence of the data packets of the terminal device by use of the second protocol stack, wherein the data to be processed comprises first data, and sequentially processing, by the terminal device, the data packets or data to be processed of the terminal device by use of the first protocol stack before the terminal device receives the second triggering information sent by the at least one of the first access network device or the second access network device comprises:

sequentially processing, by the terminal device, the first data by use of the first protocol stack;

encrypting, by the terminal device, the sequentially processed first data or data packets comprising the first data by use of the second protocol stack, and sending, by the terminal device, the encrypted data packets comprising the first data to the second network device.

20. The method of claim 19, wherein the data packets to be processed comprise first data packets, and sequentially processing, by the terminal device, the data packets or data to be processed of the terminal device by use of the first protocol stack before the terminal device receives the second triggering information sent by the at least one of the first access network device or the second access network device comprises:

receiving, by the terminal device, the first data packets sent by the second access network device;

decrypting, by the terminal device, the first data packets or a data part in each of the first data packets by use of the second protocol stack; and sequentially processing, by the terminal device, the decrypted first data packets by use of the first protocol stack.

* * * * *